(12) United States Patent
Lee

(10) Patent No.: US 10,544,890 B2
(45) Date of Patent: Jan. 28, 2020

(54) PAIR OF CONNECTORS

(71) Applicant: DENSO CORPORATION, Kariya, Aichi-pref. (JP)

(72) Inventor: Sukhwan Lee, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 118 days.

(21) Appl. No.: 15/578,274

(22) PCT Filed: May 23, 2016

(86) PCT No.: PCT/JP2016/065151
§ 371 (c)(1),
(2) Date: Nov. 30, 2017

(87) PCT Pub. No.: WO2017/002482
PCT Pub. Date: Jan. 5, 2017

(65) Prior Publication Data
US 2018/0142816 A1    May 24, 2018

(30) Foreign Application Priority Data
Jul. 1, 2015    (JP) ................................. 2015-132891

(51) Int. Cl.
*F16L 23/032*    (2006.01)
*B60H 1/32*    (2006.01)
(Continued)

(52) U.S. Cl.
CPC .......... *F16L 23/032* (2013.01); *B60H 1/3208* (2013.01); *F16L 21/035* (2013.01);
(Continued)

(58) Field of Classification Search
CPC ...... F28F 9/0246; F28F 9/0251; F28F 9/0256; F28F 9/0258; F25B 41/003; B60H 1/00571; F16L 21/08; F16L 23/032
See application file for complete search history.

(56) References Cited

U.S. PATENT DOCUMENTS

| | | | |
|---|---|---|---|
| 4,069,686 A * | 1/1978 | Hoelman | F16L 55/10 137/322 |
| 2003/0080554 A1 | 5/2003 | Schroeder et al. | |
| 2005/0023828 A1* | 2/2005 | Takeuchi | F16L 13/08 285/205 |

FOREIGN PATENT DOCUMENTS

| | | | |
|---|---|---|---|
| DE | 10250965 A1 | | 6/2003 |
| KR | 20030060559 A | * | 7/2003 |
| KR | 1020130019149 A | | 2/2013 |

* cited by examiner

*Primary Examiner* — Eric S Ruppert
(74) *Attorney, Agent, or Firm* — Harness, Dickey & Pierce, P.L.C.

(57) ABSTRACT

A pair of connectors includes first and second connectors. The first connector includes a first assembling surface that contacts the second connector. The second connector includes a second assembling surface that contacts the first assembling surface. The first connector includes a first overhanging portion, which overhangs outward from the second assembling surface in an assembled state of the first and second connectors, and a first projecting portion, which projects from the first overhanging portion beyond a location of the first assembling surface toward the second connector side in the assembled state. The second connector includes a second overhanging portion, which overhangs outward from the first assembling surface in the assembled state, and a second projecting portion, which projects from the second overhanging portion beyond a location of the second assembling surface toward the first connector side in the assembled state.

6 Claims, 26 Drawing Sheets

(51) Int. Cl.
  *F16L 21/035* (2006.01)
  *F16L 21/04* (2006.01)
  *F25B 41/06* (2006.01)
  *F16L 19/025* (2006.01)
(52) U.S. Cl.
  CPC .......... *F16L 21/045* (2013.01); *F25B 41/062* (2013.01); *F16L 19/025* (2013.01)

PAIR OF CONNECTORS

CROSS REFERENCE TO RELATED APPLICATIONS

This application is a U.S. National Phase Application under 35 U.S.C. 371 of International Application No. PCT/JP2016/065151 filed on May 23, 2016 and published in Japanese as WO 2017/002482 A1 on Jan. 5, 2017. This application is based on and claims the benefit of priority from Japanese Patent Application No. 2015-132891 filed on Jul. 1, 2015. The entire disclosures of all of the above applications are incorporated herein by reference.

TECHNICAL FIELD

The present disclosure relates to a pair of connectors, which connect between corresponding flow passage forming components that form a fluid passage for fluid.

BACKGROUND ART

The patent literature 1 recites connectors for flow passage forming components. The connectors of the patent literature 1 are connectors for refrigerant pipes used in a refrigeration cycle apparatus of a vehicle. The connectors of the patent literature 1 prevent erroneous assembling of different types of connectors relative to each other, as will be described below.

In a case of changing a type of refrigerant used in the refrigeration cycle apparatus, although respective constituent components of the refrigeration cycle apparatus need not be changed, at least a portion of the refrigerant pipe, which connects the constituent components of the refrigeration cycle needs to be changed. At least the portion of the refrigerant pipe refers to a portion of the refrigerant pipe, at which a refrigerant charge valve is installed. Therefore, at an assembling line where the refrigeration cycle apparatus is assembled to a vehicle body, a worker selects a dedicated refrigerant pipe according to the type of refrigerant used in the refrigeration cycle apparatus, and then the worker assembles the selected refrigerant pipe to the corresponding constituent components. Here, at the time of assembling the refrigeration cycle apparatus, which uses a first refrigerant, the worker may possibly erroneously assemble a refrigerant pipe for a second refrigerant that is a refrigerant, which is different from the first refrigerant.

In view of the above point, connectors, which have the following structure, are used in the patent literature 1.

At a pair of connectors for the first refrigerant, a first projecting portion is provided at an assembling surface of one of the connectors, and a second projecting portion is provided at an assembling surface of the other one of the connectors. Furthermore, a receiving hole, which receives the second projecting portion, is formed at the assembling surface of the one of the connectors, and a receiving hole, which receives the first projecting portion, is formed at the assembling surface of the other one of the connectors. The assembling surface of the respective connectors refers to a surface of the connector that contacts the mating connector in an assembled state of the pair of connectors.

In contrast, at a pair of connectors for the second refrigerant, assembling surfaces of both of the connectors are formed as planar surfaces.

Thereby, assembling of the connectors, which are designed for the same type of refrigerant, relative to each other is enabled, and erroneous assembling of the connectors, which are respectively designed for the different types of refrigerants, relative to each other is prevented. Furthermore, in the case of the connectors of the patent literature 1, it is only required to change a design of preexisting connectors or add an additional processing operation to a manufacturing process of the preexisting connectors for the connectors for the first refrigerant, and it is not required to change the design of the preexisting connectors or add the additional processing operation to the manufacturing process of the preexisting connectors for the connectors for the second refrigerant.

CITATION LIST

Patent Literature

PATENT LITERATURE 1: KR10-2013-0019149A

SUMMARY OF INVENTION

In the case of the connectors of the prior art technique discussed above, at the time of assembling the refrigeration cycle apparatus, it is possible to prevent the erroneous assembling of the flow passage forming component connected to one of the pair of connectors. However, the erroneous assembling of the flow passage forming components, which are respectively connected to the pair of connectors, cannot be prevented, as discussed below.

Specifically, in the case of the connectors of the prior art technique, the projecting portions are formed at the assembling surfaces of the pair of connectors for the first refrigerant. Therefore, in the assembled state of the pair of connectors for the first refrigerant, the projecting portions cannot be visually recognized. Thus, in the case where the outer shapes of the pair of connectors for the first refrigerant are the same as the outer shapes of the pair of connectors for the second refrigerant, it is not possible to distinguish the pair of connectors for the first refrigerant in the assembled state from the pair of connectors for the second refrigerant in the assembled state, and vice versa.

Therefore, at the time of assembling the refrigeration cycle apparatus for the first refrigerant, if the worker erroneously selects the constituent components for the second refrigerant and the refrigerant pipes for the second refrigerant, the pair of connectors for the second refrigerant can be assembled together. In consequence, the constituent components for the second refrigerant and the refrigerant pipes for the second refrigerant are assembled. In such a case, the worker cannot visually determine whether the pair of connectors is for the first refrigerant or for the second refrigerant. Thus, in the case of the connectors of the prior art technique, it is not possible to prevent the erroneous assembling of the constituent components for the second refrigerant and the refrigerant pipes for the second refrigerant at the time of assembling the refrigeration cycle apparatus for the first refrigerant.

The above disadvantage is not limited to the time of assembling the refrigeration cycle apparatus and can be encountered at the time of assembling flow passage forming components, each of which forms flow passage of liquid, relative to each other.

It is an objective of the present disclosure to enable prevention of erroneous assembling of a flow passage forming component connected to one of a pair of connectors, and to enable prevention of erroneous assembling of flow passage forming components respectively connected to the pair of connectors.

According to the present disclosure, a pair of connectors includes:

a first connector that is provided to a first flow passage forming member, which forms a flow passage of fluid; and a second connector that is provided to a second flow passage forming member, which forms a flow passage of the fluid, while the second connector is assembled to the first connector, wherein:

the first connector includes a first assembling surface that contacts the second connector in an assembled state where the first connector and the second connector are assembled together;

a first flow passage through-hole and a first fixation through-hole are formed in the first assembling surface;

the second connector includes a second assembling surface that contacts the first assembling surface in the assembled state where the first connector and the second connector are assembled together;

a second flow passage through-hole is formed at a corresponding location of the second assembling surface, which is opposed to the first flow passage through-hole in the assembled state where the first connector and the second connector are assembled together, and a second fixation through-hole is formed at a corresponding location of the second assembling surface, which is opposed to the first fixation through-hole in the assembled state where the first connector and the second connector are assembled together;

in the assembled state where the first connector and the second connector are assembled together, a fixing member is inserted into the first fixation through-hole and the second fixation through-hole, and the fluid flows from one of the first flow passage forming member and the second flow passage forming member to the other one of the first flow passage forming member and the second flow passage forming member through the first flow passage through-hole and the second flow passage through-hole;

the first connector includes a first overhanging portion, which overhangs outward from the second assembling surface in the assembled state where the first connector and the second connector are assembled together, and a first projecting portion, which projects from the first overhanging portion beyond a location of the first assembling surface toward the second connector side in the assembled state where the first connector and the second connector are assembled together; and the second connector includes a second overhanging portion, which overhangs outward from the first assembling surface in the assembled state where the first connector and the second connector are assembled together, and a second projecting portion, which projects from the second overhanging portion beyond a location of the second assembling surface toward the first connector side in the assembled state where the first connector and the second connector are assembled together.

At the time of assembling the first and second connectors together according to the present disclosure, the first projecting portion does not contact the second assembling surface, and the second projecting portion does not contact the first assembling surface. Therefore, the first and second connectors of the present disclosure are assembled together. In contrast, it is impossible to assemble the first connector of the present disclosure with another type of second connector, which is different from the second connector of the present disclosure and has a second assembling surface, against which the first projecting portion of the first connector contacts. Similarly, it is impossible to assemble the second connector of the present disclosure with another type of first connector, which is different from the first connector of the present disclosure and has a first assembling surface, against which the second projecting portion of the second connector contacts.

Thereby, the erroneous assembling of the inappropriate combination of connectors can be limited. As a result, the erroneous assembling of one of the first flow passage forming member and the second flow passage forming member can be limited.

In the assembled state of the first and second connectors of the present disclosure, the first projecting portion is located at the outside of the second connector, and the second projecting portion is located at the outside of the first connector. Therefore, even after the assembling of the first and second connectors, the first and second projecting portions can be visually recognized. As a result, after the assembling of the first and second connectors, it is possible to determine whether both of the first and second connectors are appropriately used by visually checking whether the first and second projecting portions are present with the eyes of the worker.

Thus, according to the present disclosure, it is possible to limit the erroneous assembling of the flow passage forming components communicated to the pair of connectors, respectively.

DESCRIPTION OF EMBODIMENTS

Hereinafter, various embodiments of the present disclosure will be described with reference to the accompanying drawings. In each of the following embodiments, the same portions or equivalent portions are indicated by the same reference signs.

(First Embodiment)

In the present embodiment, pairs of connectors of the present disclosure are used as pairs of connectors that connect an inlet pipe and an outlet pipe, which extend from a condenser, to refrigerant pipes, which are formed separately from the inlet pipe and the outlet pipe, in a refrigeration cycle apparatus that constitutes a vehicle air conditioning system.

Figure 1:
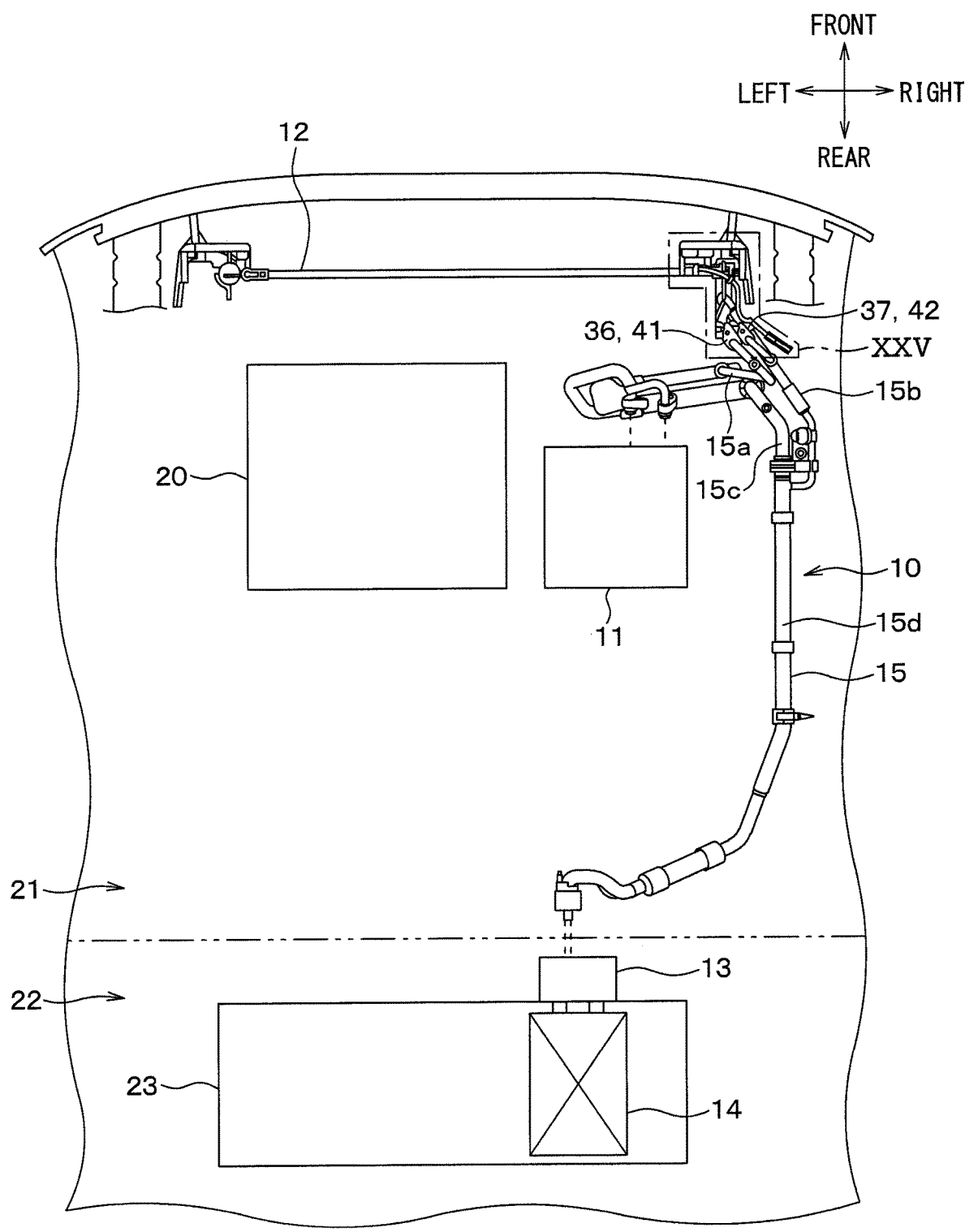
FIG. 1 is a plan view showing a state where a refrigeration cycle apparatus of a first embodiment is placed in a vehicle.
Figure 2:
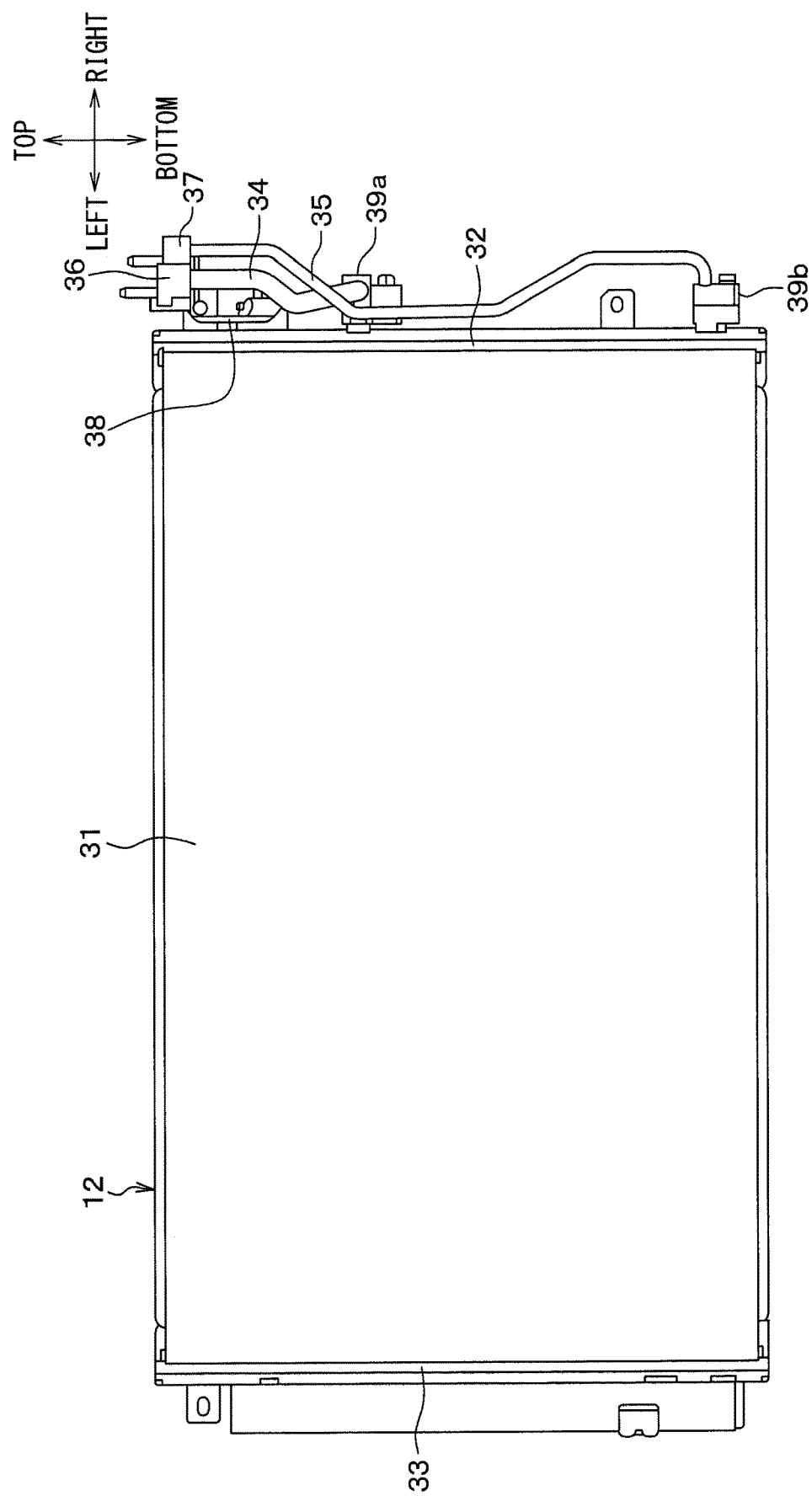
FIG. 2 is a front view of a condenser of FIG. 1 taken from a vehicle rear side.
Figure 3:
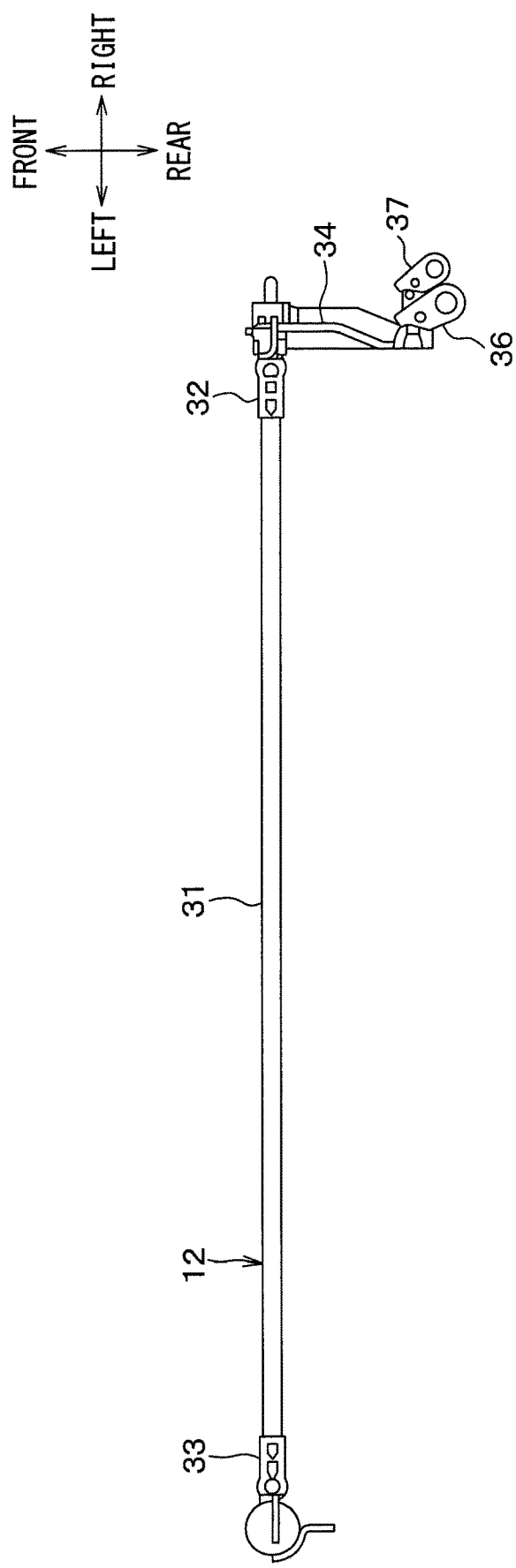
FIG. 3 is a top view of the condenser of FIG. 1.

As shown in FIG. 1, the refrigeration cycle apparatus 10 includes a compressor 11, a condenser 12, an expansion valve 13, an evaporator 14 and refrigerant pipes 15, which interconnect these constituent components.

The compressor 11 compresses low pressure refrigerant drawn therein and discharges the compressed high pressure refrigerant. The condenser 12 is a heat releasing heat exchanger, i.e., a heat radiator that condenses the high pressure refrigerant, which is discharged from the compressor 11, by releasing heat from the high pressure refrigerant through heat exchange with external air. The expansion valve 13 is a pressure reducing device that expands the refrigerant outputted from the condenser 12 by depressurizing the refrigerant. The evaporator 14 is a heat absorbing heat exchanger that evaporates the refrigerant, which is outputted from the expansion valve 13, by absorbing the heat from the refrigerant through heat exchange with blowing air that is blown into a vehicle cabin.

The compressor 11 and the condenser 12 are placed in an engine room 21 of a vehicle, which receives an engine 20 that drives the vehicle. The compressor 11 is placed adjacent to the engine 20. The condenser 12 is placed at a vehicle front side in the engine room 21. The expansion valve 13 and the evaporator 14 are included in a cabin air conditioning unit 23 that is placed in the vehicle cabin 22.

The refrigerant pipes 15 include refrigerant pipes 15a, 15b, 15c. The refrigerant pipe 15a connects between a refrigerant inlet side of the condenser 12 and a refrigerant discharge outlet side of the compressor 11. The refrigerant pipe 15b connects between a refrigerant outlet side of the condenser 12 and a refrigerant inlet side of the expansion valve 13. The refrigerant pipe 15c connects between a refrigerant suction inlet side of the compressor 11 and a refrigerant outlet side of the evaporator 14. In the present embodiment, a portion of the refrigerant pipe 15b and a portion of the refrigerant pipe 15c are formed by one refrigerant pipe 15d, which includes an inner tube and an outer tube, i.e., an internal heat exchanger 15d.

As shown in FIGS. 2, 3, 4 and 5, the condenser 12 includes a heat exchange core 31 and a pair of header tanks 32, 33. The heat exchange core 31 is a core that includes a plurality of tubes (not shown), through which the refrigerant flows. The tubes extend in a vehicle left-to-right direction. The header tanks 32, 33 are respectively arranged on one side and another side of the heat exchange core 31 in the vehicle left-to-right direction and are respectively communicated with two end portions of the respective tubes.

The condenser 12 includes an inlet pipe 34 and an outlet pipe 35, which are provided to the header tank 32. The inlet pipe 34 is a pipe that is communicated with a refrigerant inlet of the condenser 12. The refrigerant, which is inputted from the inlet pipe 34, flows in the inside of the condenser 12. The outlet pipe 35 is a pipe that is communicated with a refrigerant outlet of the condenser 12. The refrigerant, which is conducted through the condenser 12, is outputted from the outlet pipe 35. The inlet pipe 34 and the outlet pipe 35 both extend upwardly from the header tank 32. An inlet pipe side connector 36 is installed to an end portion of the inlet pipe 34, and an outlet pipe side connector 37 is installed to an end portion of the outlet pipe 35. The inlet pipe side connector 36 and the outlet pipe side connector 37 are arranged next to each other and are placed at a location that is adjacent to an upper end portion of the header tank 32. The inlet pipe side connector 36 and the outlet pipe side connector 37 are held by a holding member 38 that is installed to the condenser 12.

The inlet pipe 34 and the inlet pipe side connector 36 are joined together by brazing. The outlet pipe 35 and the outlet pipe side connector 37 are joined together by brazing. The inlet pipe 34 and the outlet pipe 35 are fixed to the condenser 12 through connectors 39a, 39b, respectively. The inlet pipe 34, the inlet pipe side connector 36, the outlet pipe 35, and the outlet pipe side connector 37 are integrally assembled to the condenser 12 in a state before installation to the vehicle body.

Figure 4:
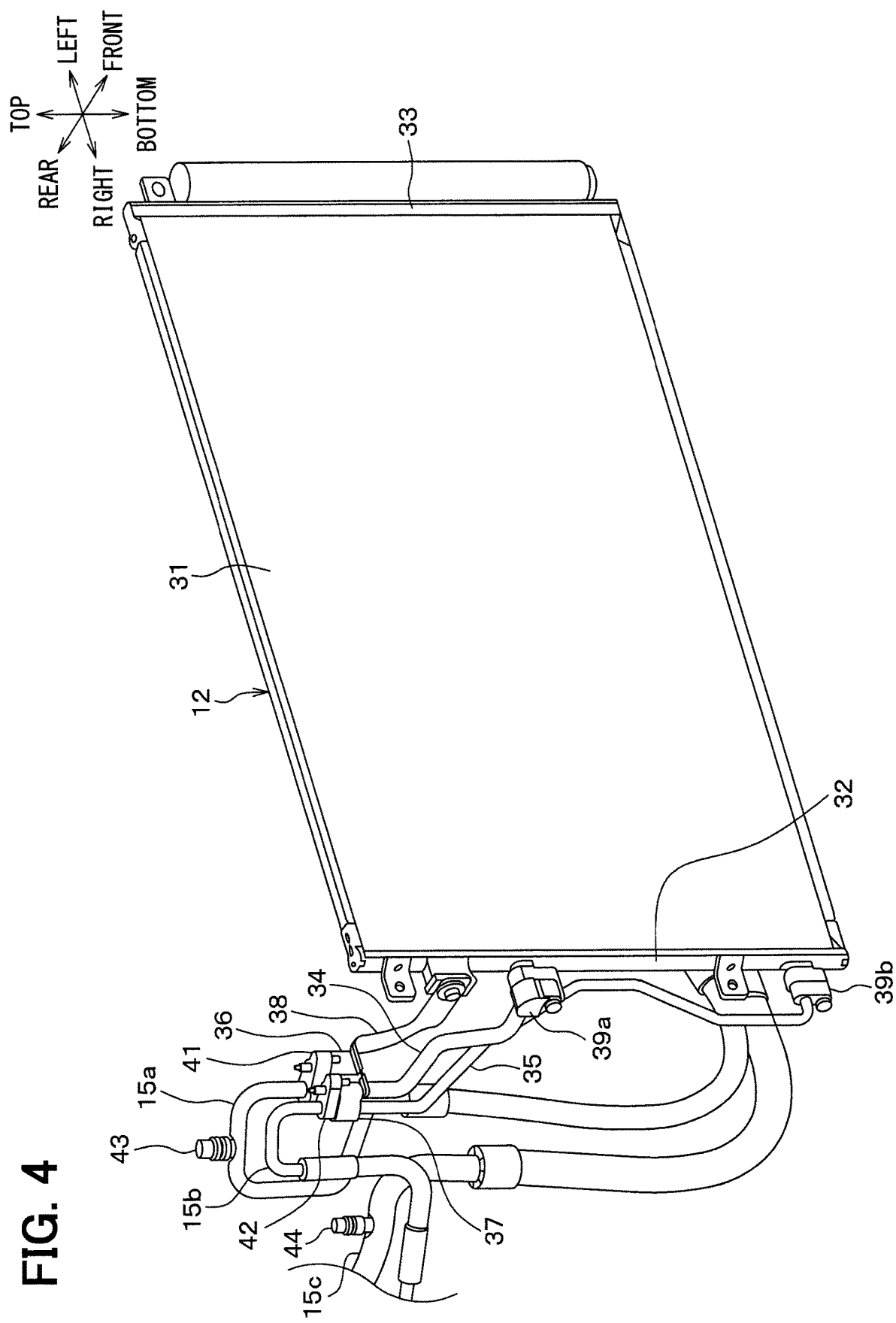
FIG. 4 is a perspective view of the condenser of FIG. 1 in a connected state where refrigerant pipes are connected to the condenser.
Figure 5:
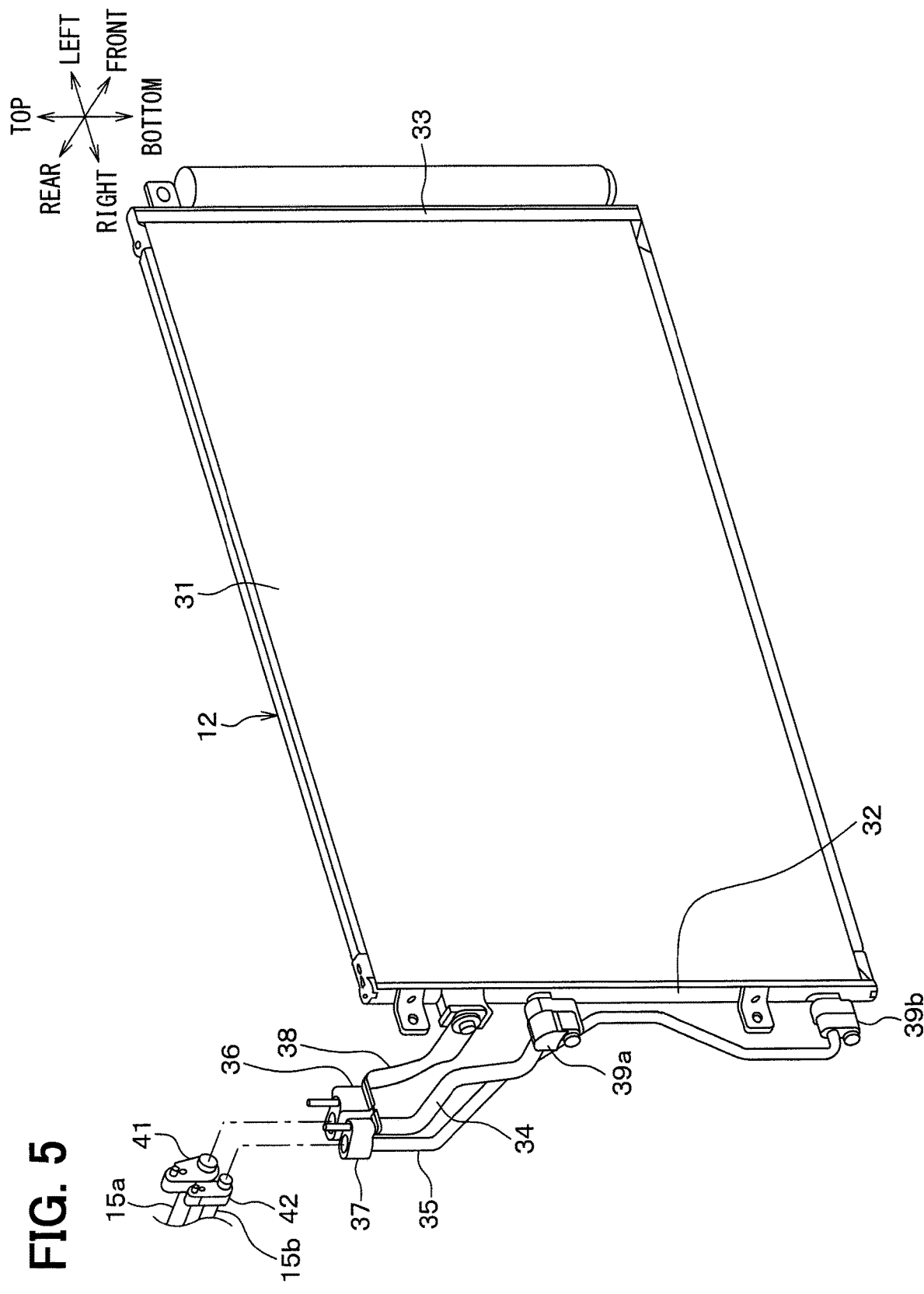
FIG. 5 is a perspective view of the condenser of FIG. 1 in a state before the refrigerant pipes are connected to the condenser.

As shown in FIGS. 4 and 5, a refrigerant pipe side connector 41 is installed to an end portion of the refrigerant pipe 15a, which is connected to the inlet pipe 34. When the inlet pipe side connector 36 and the refrigerant pipe side connector 41 are assembled together, the inlet pipe 34 and the refrigerant pipe 15a are connected with each other. Therefore, the inlet pipe side connector 36 and the refrigerant pipe side connector 41 serve as a pair of connectors.

Similarly, a refrigerant pipe side connector 42 is installed to an end portion of the refrigerant pipe 15b, which is connected to the outlet pipe 35. When the outlet pipe side connector 37 and the refrigerant pipe side connector 42 are assembled together, the outlet pipe 35 and the refrigerant pipe 15b are connected with each other. Therefore, the outlet pipe side connector 37 and the refrigerant pipe side connector 42 serve as a pair of connectors.

As shown in FIG. 4, charge valves 43, 44 are installed to the refrigerant pipes 15a, 15c, respectively. The charge valves 43, 44 are for charging the refrigerant. The charge valves 43, 44 are joined to refrigerant charge inlets, respectively, of the refrigerant pipes 15a, 15c and are thereby integrated with the refrigerant pipes 15a, 15c, respectively. A configuration of each of the charge valves 43, 44 varies depending on a type of the refrigerant. Here, a refrigeration cycle apparatus 10 of the present embodiment uses R1234yf as the refrigerant, more specifically, a first refrigerant. Therefore, the refrigerant pipes 15a, 15c have the charge valves 43, 44 for the first refrigerant.

Thus, the refrigerant pipes 15 of the present embodiment are refrigerant pipes dedicated to the first refrigerant. The inlet pipe side connector 36 and the refrigerant pipe side connector 41 serve as the pair of connectors for the first refrigerant. Furthermore, the outlet pipe side connector 37 and the refrigerant pipe side connector 42 serve as the pair of connectors for the first refrigerant.

Next, the inlet pipe side connector 36 and the refrigerant pipe side connector 41, i.e., the pair of connectors will be described with reference to FIGS. 6 to 14. In the following discussion, the inlet pipe side connector 36 will be referred to as a first connector, and the refrigerant pipe side connector 41 will be referred to as a second connector. Since the outlet pipe side connector 37 and the refrigerant pipe side connector 42 respectively have the similar structures that are similar to those of the inlet pipe side connector 36 and the refrigerant pipe side connector 41, the outlet pipe side connector 37 and the refrigerant pipe side connector 42 will not be described for the sake of simplicity. The outlet pipe side connector 37 corresponds to the first connector, and the refrigerant pipe side connector 42 corresponds to the second connector.

The first and second connectors 36, 41 are often referred to as block joints. Each of the first and second connectors 36, 41 is a block body made of metal and is manufactured by a die-casting method from a metal material, such as aluminum or aluminum-based metal material.

Figure 6:
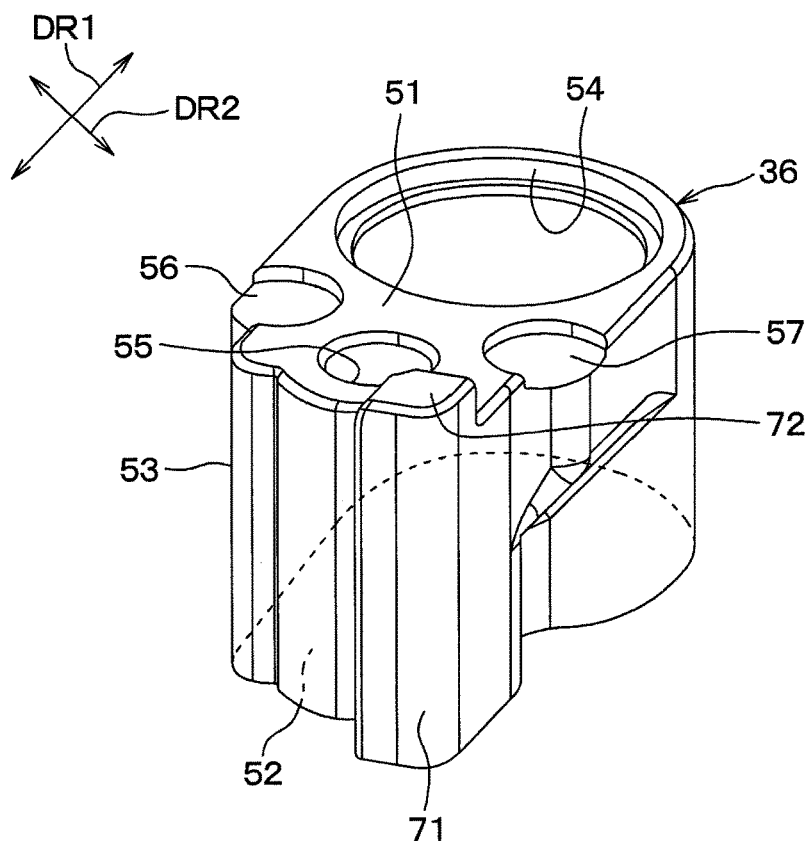
FIG. 6 is a perspective view of a first connector for a first refrigerant according to the first embodiment.
Figure 7:
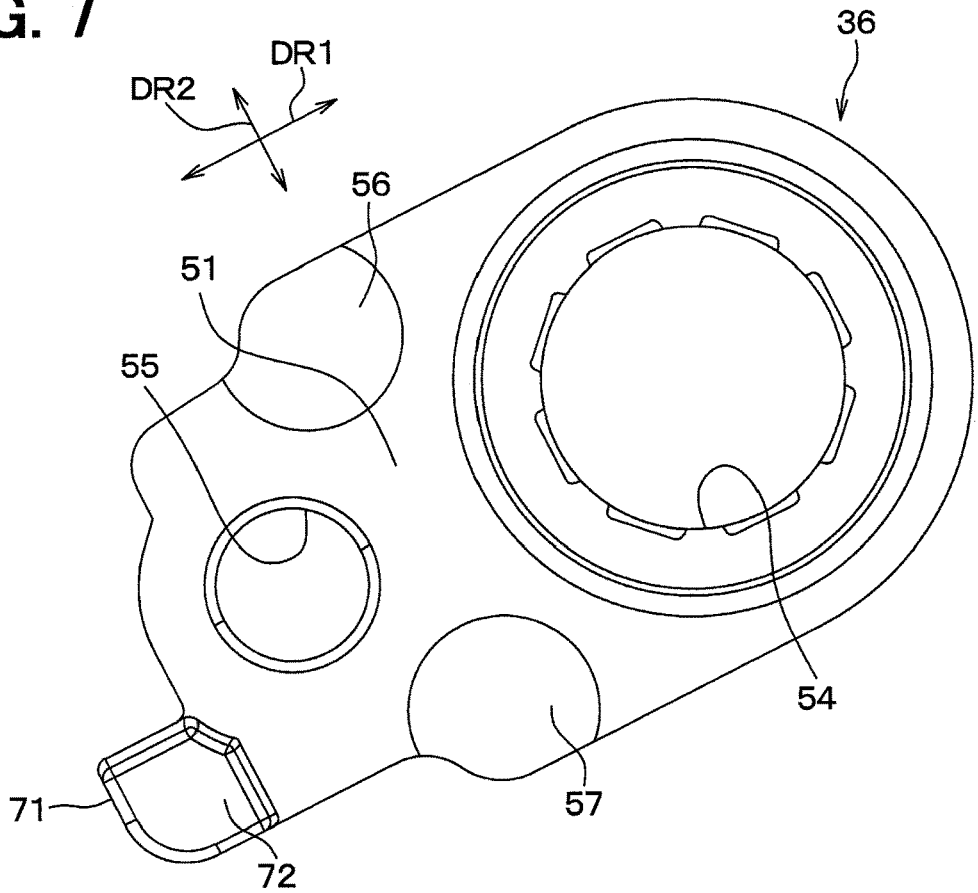
FIG. 7 is a plan view of the first connector for the first refrigerant according to the first embodiment.

Specifically, as shown in FIGS. 6 and 7, the first connector 36 includes one surface 51, another surface 52 and a peripheral surface 53. The other surface 52 is placed on an opposite side that is opposite to the one surface 51. The peripheral surface 53 is connected to both of the one surface 51 and the other surface 52. The one surface 51 and the other surface 52 are both planar surfaces. In an assembled state of the first and second connectors 36, 41 where the first and second connectors 36, 41 are assembled together, the one surface 51, which is placed at the second connector 41 side, forms an assembling surface. The assembling surface is a surface that is opposed to and contacts the mating connector in the assembled state of the first and second connectors 36, 41. In the following discussion, the assembling surface 51 of the first connector 36 will be referred to as a first assembling surface 51.

A first flow passage through-hole 54 and a first fixation through-hole 55 are formed at the first assembling surface 51. The first flow passage through-hole 54 is a through-hole, to which the inlet pipe 34 is connected. The first fixation through-hole 55 is a through-hole, into which a screw 66 (serving as a fixing member) is inserted (see FIG. 12), and a screw thread is formed in an inner wall of the first fixation through-hole 55. The first flow passage through-hole 54 and the first fixation through-hole 55 both extend through the first assembling surface 51 and the other surface 52. An axis of the first flow passage through-hole 54 and an axis of the first fixation through-hole 55 are both perpendicular to the first assembling surface 51.

Two recesses 56, 57 are formed at the first assembling surface 51. Each of these recesses 56, 57 is formed when a die removing rod is urged against the first assembling surface 51 at the time of manufacturing.

Figure 8:
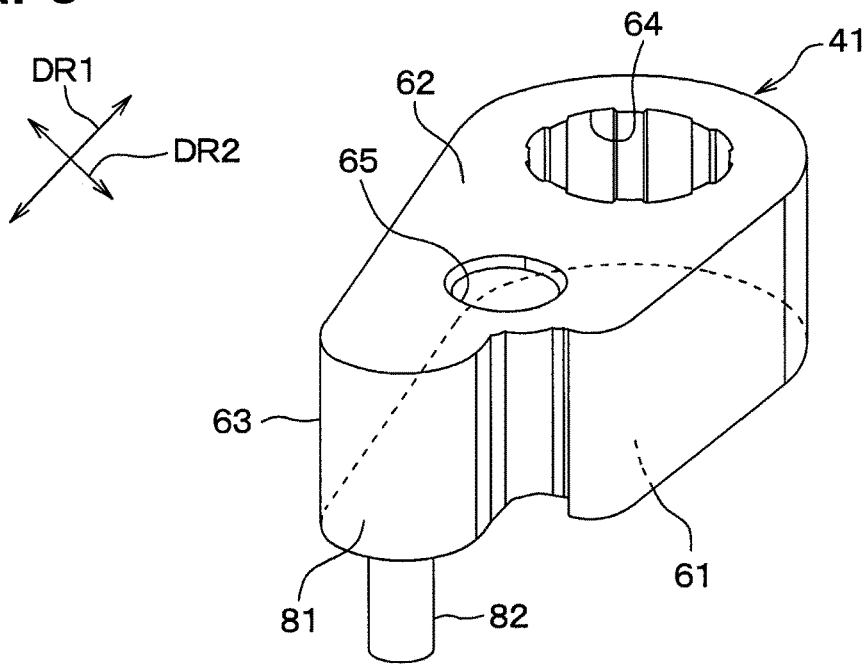
FIG. 8 is a perspective view of a second connector for the first refrigerant according to the first embodiment.
Figure 9:
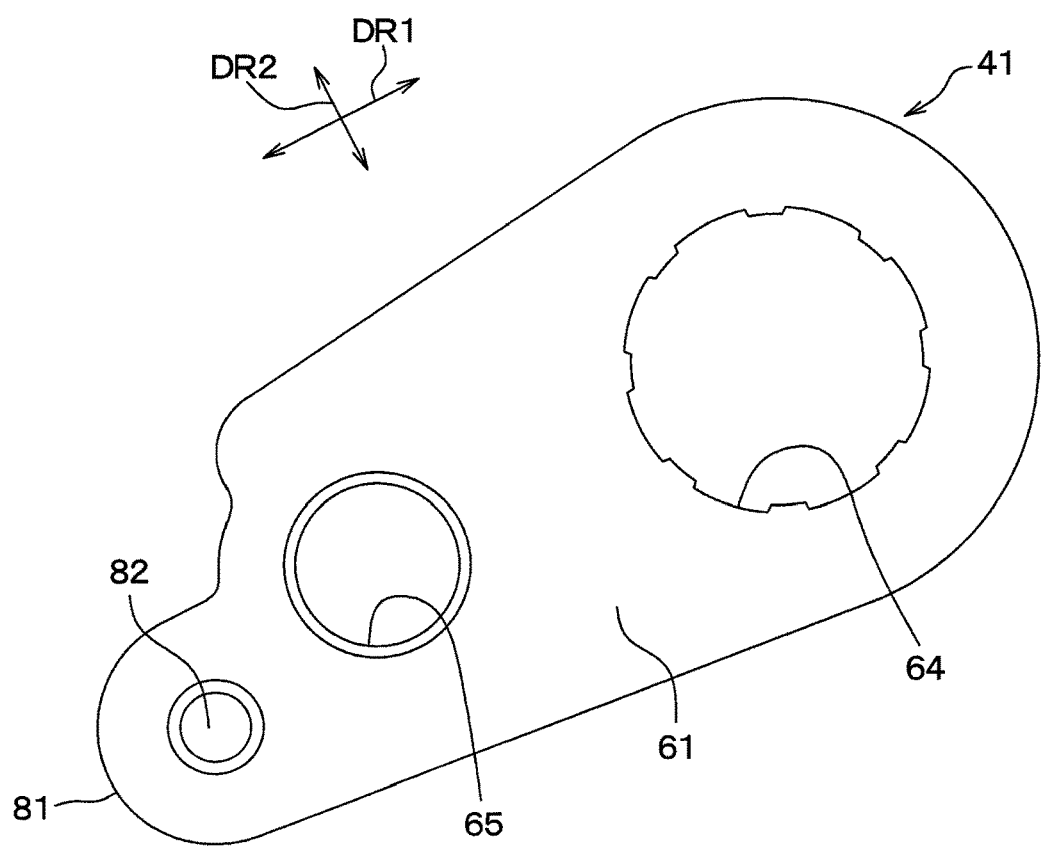
FIG. 9 is a plan view of the second connector for the first refrigerant according to the first embodiment.

As shown in FIGS. 8 and 9, the second connector 41 includes one surface 61, another surface 62 and a peripheral surface 63. The other surface 62 is placed on an opposite side that is opposite to the one surface 61. The peripheral surface 63 is connected to both of the one surface 61 and the other surface 62. The one surface 61 and the other surface 62 are both planar surfaces. In the assembled state of the first and second connectors 36, 41, the one surface 61, which is placed at the first connector 36 side, forms an assembling surface. In the following discussion, the assembling surface 61 of the second connector 41 will be referred to as a second assembling surface 61.

A second flow passage through-hole 64 and a second fixation through-hole 65 are formed at the second assembling surface 61. The second flow passage through-hole 64 is a through-hole, to which the refrigerant pipe 15a is connected. The second fixation through-hole 65 is a through-hole, into which the screw 66 is inserted (see FIG. 12), and a screw thread is formed in an inner wall of the second fixation through-hole 65. The second flow passage through-hole 64 and the second fixation through-hole 65 both extend through the second assembling surface 61 and the other surface 62.

In the assembled state of the first and second connectors 36, 41, the second flow passage through-hole 64 is formed at a corresponding location of the second assembling surface 61, which is opposed to the first flow passage through-hole 54, and the second fixation through-hole 65 is formed at a corresponding location of the second assembling surface 61, which is opposed to the first fixation through-hole 55.

Figure 10:
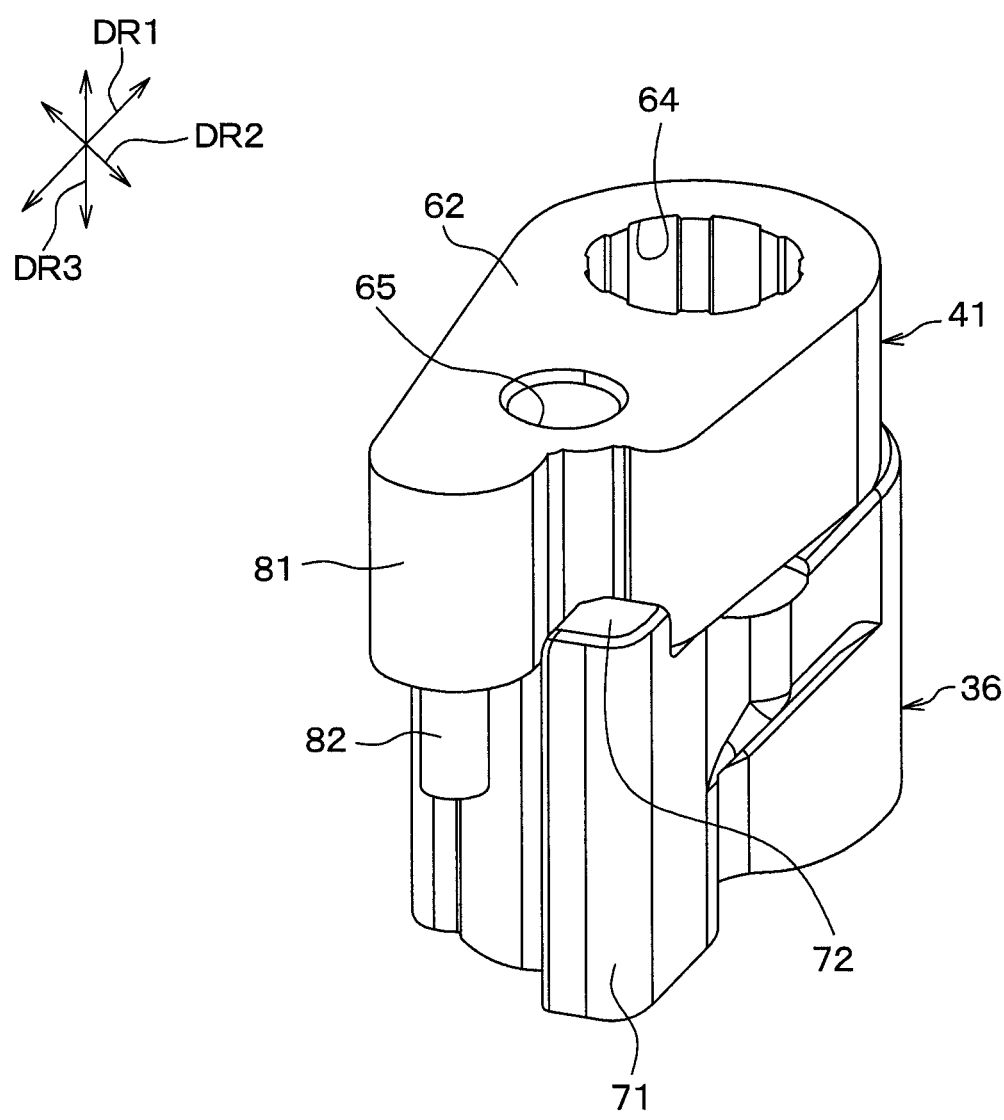
FIG. 10 is a perspective view showing an assembled state of the first and second connectors for the first refrigerant according to the first embodiment.
Figure 11:
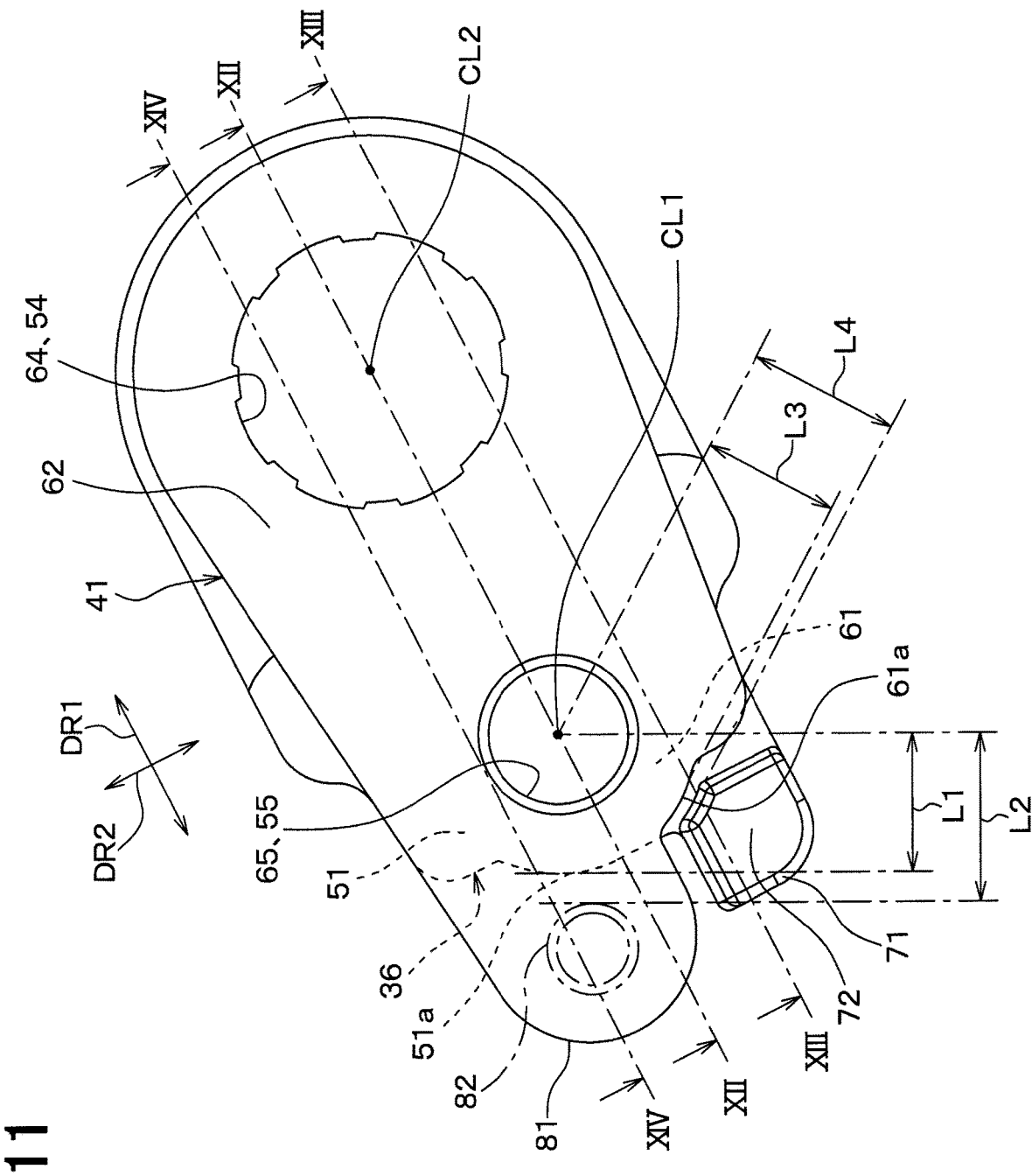
FIG. 11 is a plan view showing the assembled state of the first and second connectors for the first refrigerant according to the first embodiment.
Figure 12:
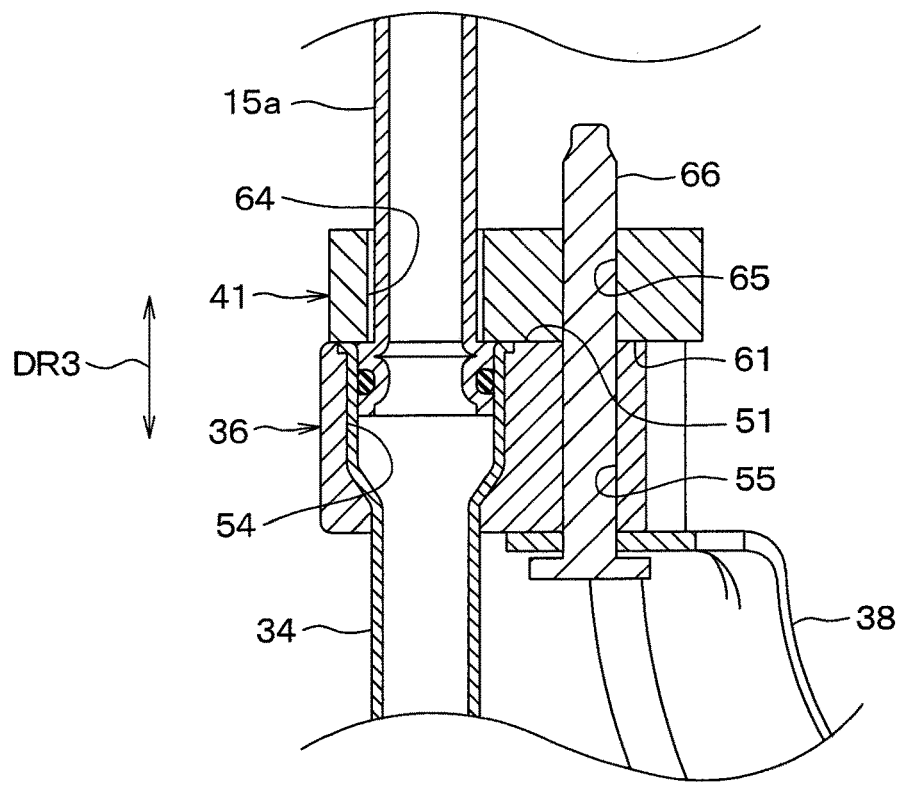
FIG. 12 is a cross sectional view taken along line XII-XII in FIG. 11.

The first and second assembling surfaces 51, 61 contact with each other, and thereby the first and second connectors 36, 41 are assembled together, as shown in FIGS. 10 and 11. At this time, as shown in FIG. 12, the first and second flow passage through-holes 54, 64 are communicated with each other, and the first and second fixation through-holes 55, 65 are communicated with each other. In this communicated state, the screw 66 is inserted into the first and second fixation through-holes 55, 65. In this way, the first and second connectors 36, 41 are joined together, and the inlet pipe 34 and the refrigerant pipe 15a are connected with each other.

As shown in FIG. 12, in the present embodiment, the inlet pipe 34 is inserted into the first flow passage through-hole 54 such that the location of the end portion of the inlet pipe 34 coincides with the location of the first assembling surface 51. In this way, the first flow passage through-hole 54 and the inlet pipe 34 are connected with each other. The refrigerant pipe 15a is inserted into the second flow passage through-hole 64 such that the refrigerant pipe 15a projects from the second assembling surface 61. In this way, the second flow passage through-hole 64 and the refrigerant pipe 15a are connected with each other. In the assembled state of the first and second connectors 36, 41, the end portion of the refrigerant pipe 15a is inserted into the inside of the inlet pipe 34, so that the inlet pipe 34 and the refrigerant pipe 15a are connected with each other.

When the first and second connectors 36, 41 are assembled in the above described manner, the refrigerant can flow from the refrigerant pipe 15a to the inlet pipe 34 through the first flow passage through-hole 54 and the second flow passage through-hole 64. The above discussion is also equally applied to the outlet pipe side connector 37 and the refrigerant pipe side connector 42. When the first and second connectors 37, 42 are assembled together, the refrigerant can flow from the outlet pipe 35 to the refrigerant pipe 15b through the first flow passage through-hole 54 and the second flow passage through-hole 64.

Furthermore, as shown in FIGS. 6 and 7, the first connector 36 of the present embodiment includes a first overhanging portion 71 and a first projecting portion 72. Similarly, as shown in FIGS. 8 and 9, the second connector 41 of the present embodiment includes a second overhanging portion 81 and a second projecting portion 82.

As shown in FIGS. 10 and 11, the first overhanging portion 71 is a portion of the first connector 36 that overhangs outward from the second assembling surface 61 of the second connector 41 when the first and second connectors 36, 41 in the assembled state are viewed in an axial direction DR3 of the first and second fixation through-holes 55, 65. In other words, the first overhanging portion 71 is a portion of the first connector 36 that is placed on an outer side of the second assembling surface 61 of the second connector 41 in a direction that is perpendicular the axial direction DR3 of the first and second fixation through-holes 55, 65 in the assembled state of the first and second connectors 36, 41.

More specifically, as shown in FIG. 7, the first overhanging portion 71 is formed at an end portion of the first connector 36, which is located at the first fixation through-hole 55 side in the first direction DR1. The first direction DR1 in FIG. 7 is a direction of a row of the first flow passage through-hole 54 and the first fixation through-hole 55, along which the first flow passage through-hole 54 and the first fixation through-hole 55 are arranged one after another. Furthermore, the second direction DR2 in FIG. 7 is a direction that is perpendicular to the first direction DR1. More specifically, as shown in FIG. 11, the first direction DR1 is a direction of a straight line that connects between a center CL1 of the first and second fixation through-holes 55, 65 and a center CL2 of the first and second flow passage through-holes 54, 64.

The first overhanging portion 71 overhangs from a part of the first connector 36, which includes the first assembling surface 51, in a direction away from the first fixation through-hole 55 along the first direction DR1. Therefore, the first connector 36 is shaped into an elongated form that is elongated in the first direction DR1.

Figure 13:
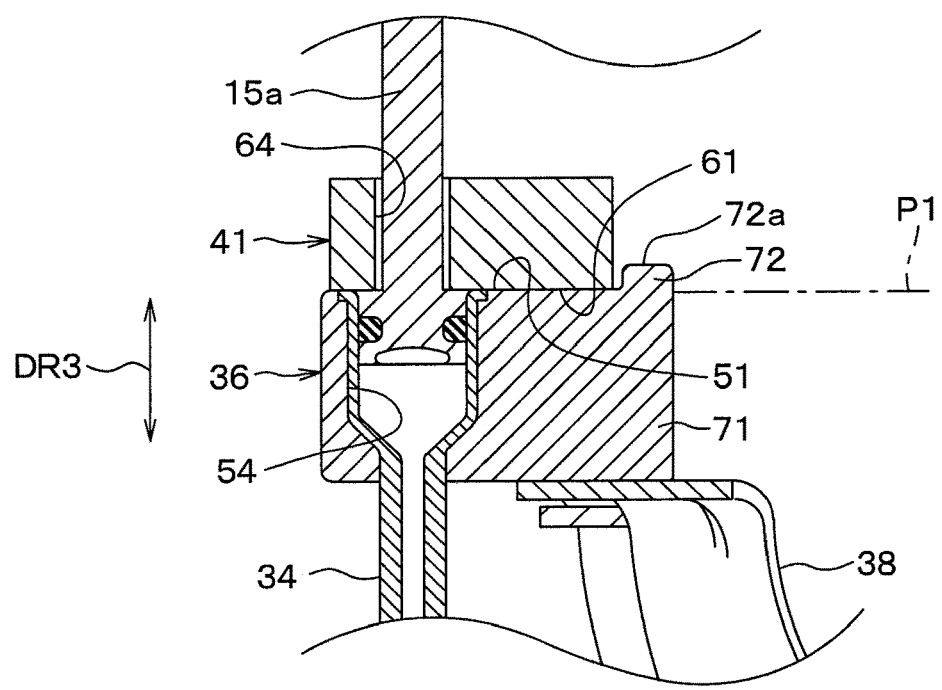
FIG. 13 is a cross sectional view taken along line XIII-XIII in FIG. 11.

As shown in FIG. 13, the first projecting portion 72 is a portion that is projected from the first overhanging portion 71 toward the second connector 41 beyond a location P1 of the first assembling surface 51. Therefore, a distal end 72a of the first projecting portion 72 is located on the second connector 41 side of the location P1 of the first assembling surface 51 in the axial direction DR3 of the first and second fixation through-holes 55, 65. The first projecting portion 72 is formed integrally with the first overhanging portion 71 in one-piece. The first projecting portion 72 is formed by forming a step between the first assembling surface 51 and the first overhanging portion 71.

As shown in FIGS. 10 and 11, the second overhanging portion 81 is a portion of the second connector 41 that overhangs outward from the first assembling surface 51 of the first connector 36 when the first and second connectors 36, 41 in the assembled state are viewed in the axial direction DR3 of the first and second fixation through-holes 55, 65. In other words, the second overhanging portion 81 is a portion of the second connector 41 that is placed on an outer side of the first assembling surface 51 of the first connector 36 in the direction that is perpendicular the axial direction DR3 of the first and second fixation through-holes 55, 65 in the assembled state of the first and second connectors 36, 41.

More specifically, similar to the first overhanging portion 71, as shown in FIG. 9, the second overhanging portion 81 is formed at an end portion of the second connector 41, which is located at the second fixation through-hole 65 side in the first direction DR1. Similar to the first direction DR1 shown in FIG. 7, the first direction DR1 in FIG. 9 is a direction of a row of the second flow passage through-hole 64 and the second fixation through-hole 65, along with the second flow passage through-hole 64 and the second fixation through-hole 65 are arranged one after another. The second overhanging portion 81 overhangs from a part of the second connector 41, which includes the second assembling surface 61, in a direction away from the second fixation through-hole 65 along the first direction DR1. Therefore, the second connector 41 is shaped into an elongated form that is elongated in the first direction DR1.

As shown in FIG. 11, the first overhanging portion 71 and the second overhanging portion 81 are placed at corresponding locations, respectively, which are displaced from each other in the second direction DR2 such that the first overhanging portion 71 and the second overhanging portion 81 do not interfere with each other at the time of assembling the first and second connectors 36, 41 together. That is, the first overhanging portion 71 and the second overhanging portion 81 are placed at one side and the other side in the second direction DR2.

Figure 14:
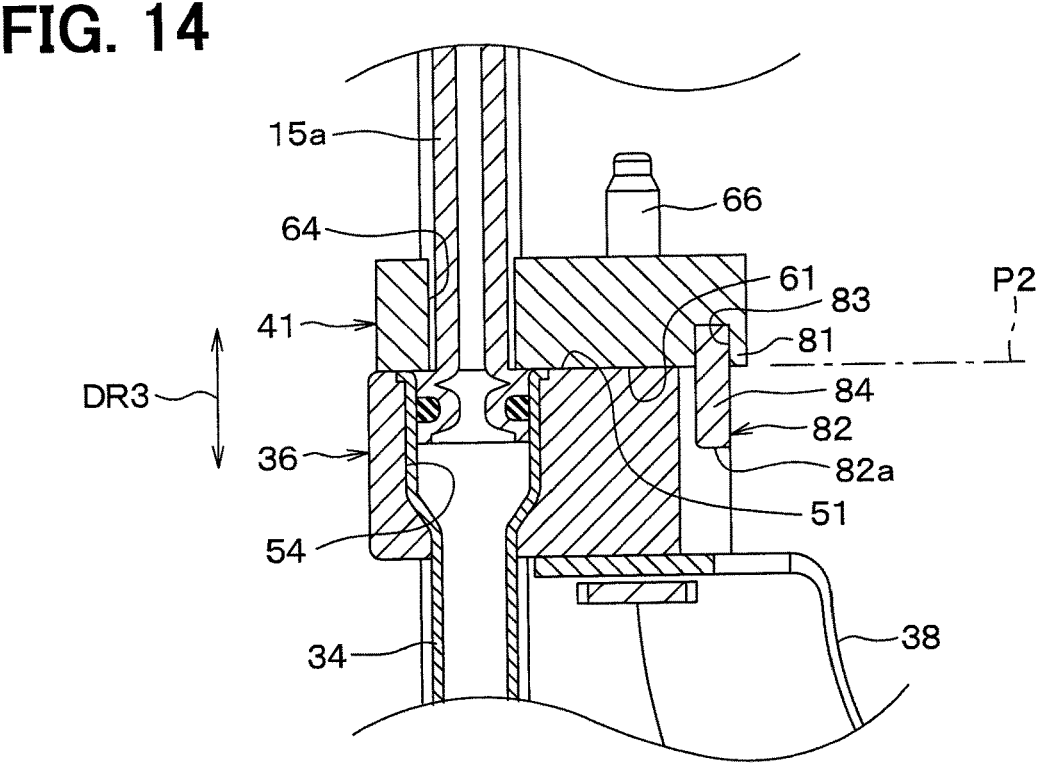
FIG. 14 is a cross sectional view taken along line XIV-XIV in FIG. 11.

As shown in FIG. 14, the second projecting portion 82 is a portion that projects from the second overhanging portion 81 toward the first connector 36 beyond a location P2 of the second assembling surface 61. Therefore, a distal end 82a of the second projecting portion 82 is located on the first connector 36 side of the location P2 of the second assembling surface 61 in the axial direction DR3 of the first and second fixation through-holes 55, 65. A surface of the second overhanging portion 81, which is located on the first connector 36 side, is a planar surface that is flush with the second assembling surface 61. The second projecting portion 82 is formed by a press fitting pin 84, which is press fitted into a hole 83 that is formed in the surface of the second overhanging portion 81 located on the first connector 36 side.

Furthermore, as shown in FIG. 11, at an outer peripheral edge portion of the first assembling surface 51, a location of a part 51a, which corresponds to the second projecting portion 82, is set such that the second projecting portion 82 is placed on an outer side of the first connector 36 in the assembled state of the first and second connectors 36, 41. Specifically, at the part 51a, which corresponds to the second projecting portion 82, in the outer peripheral edge portion of the first assembling surface 51, a distance L1, which is measured from the center CL1 of the first fixation through-hole 55 to the outer peripheral edge portion of the first assembling surface 51, is set to be shorter than a distance L2, which is measured from the center CL1 of the second fixation through-hole 65 to the second projecting portion 82.

Similarly, at an outer peripheral edge portion of the second assembling surface 61, a location of a part 61a, which corresponds to the first projecting portion 72, is set such that the first projecting portion 72 is placed on an outer side of the second connector 41 in the assembled state of the first and second connectors 36, 41. That is, at the part 61a, which corresponds to the first projecting portion 72, in the outer peripheral edge portion of the second assembling surface 61, a distance L3, which is measured from the center CL1 of the second fixation through-hole 65 to the outer peripheral edge portion of the second assembling surface 61, is set to be shorter than a distance L4, which is measured from the center CL1 of the first fixation through-hole 55 to the first projecting portion 72.

Next, a relationship between the pair of connectors 36, 41 for the first refrigerant and the pair of connectors J36, J41 for a second refrigerant shown in FIGS. 15 to 20 according to the present embodiment will be described. The pair of connectors J36, J41 for the second refrigerant is used in the refrigeration cycle apparatus 10, which uses R134a as the refrigerant, more specifically, the second refrigerant. The pair of connectors J36, J41 for the second refrigerant has a basic structure of the pair of connectors 36, 41 for the first refrigerant. In other words, the pair of connectors 36, 41 for the first refrigerant according to the present embodiment is formed by changing the design of the pair of connectors J36, J41 for the second refrigerant.

As shown in FIGS. 15 to 20, the first and second connectors J36, J41 for the second refrigerant have the same structures as those of the first and second connectors 36, 41 for the first refrigerant except that the first and second connectors J36, J41 do not have the first and second overhanging portions 71, 81, respectively.

Figure 15:
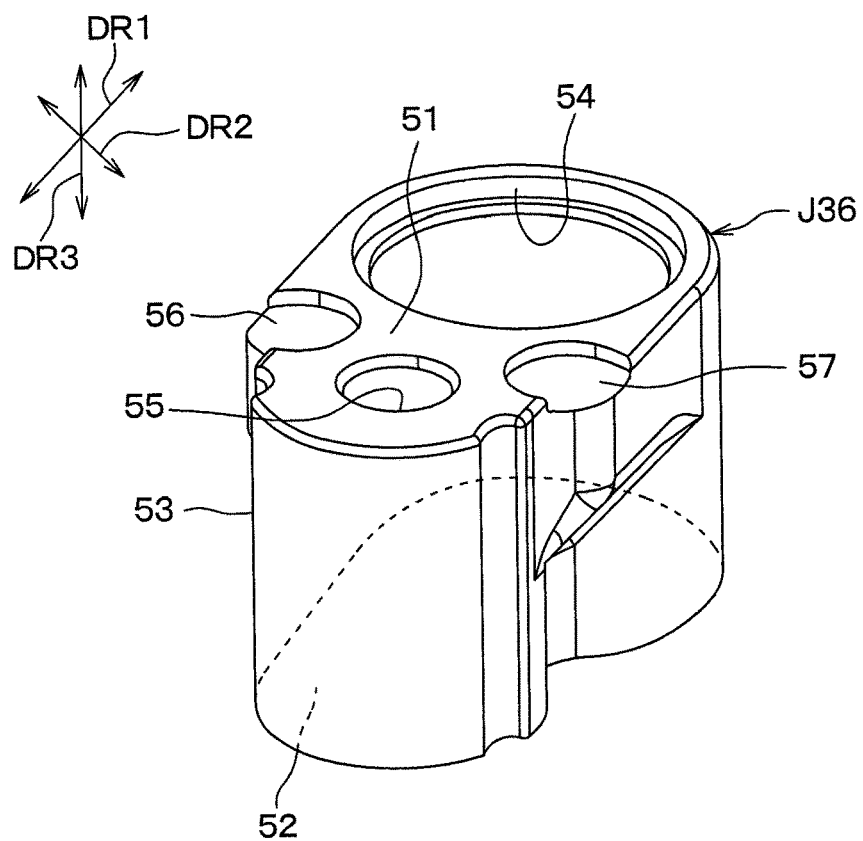
FIG. 15 is a perspective view of a first connector for a second refrigerant according to the first embodiment.
Figure 16:
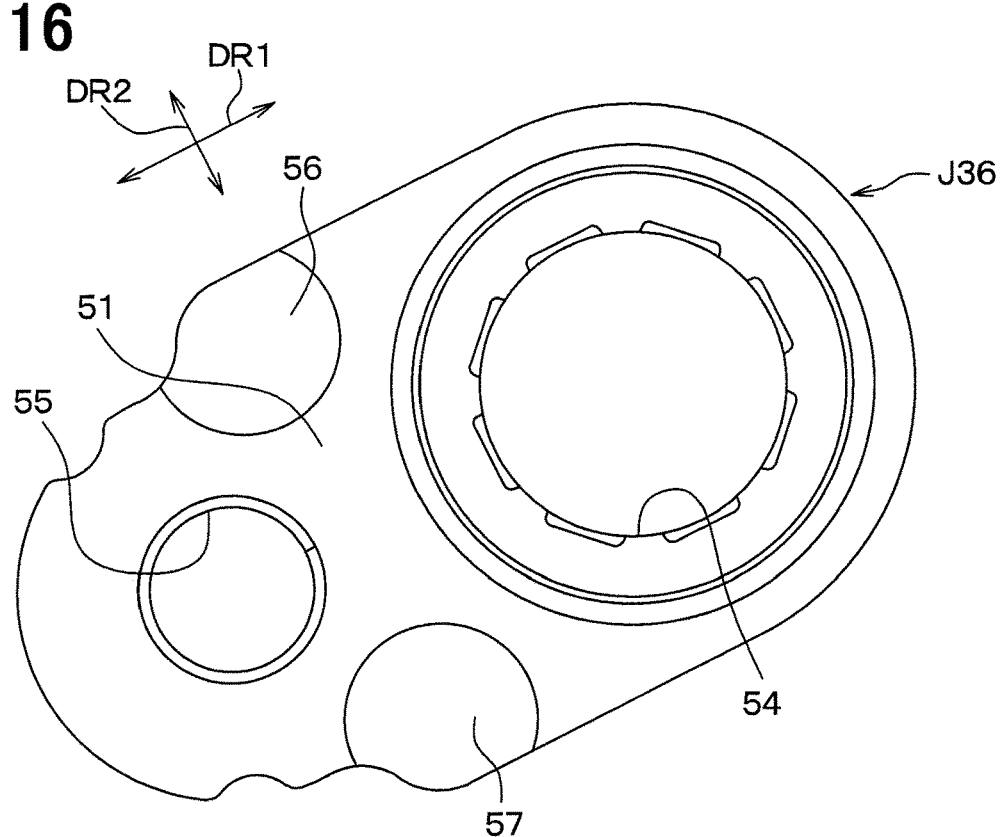
FIG. 16 is a plan view of the first connector for the second refrigerant according to the first embodiment.

Similar to the first connector 36 for the first refrigerant, as shown in FIGS. 15 and 16, the first flow passage through-hole 54 and the first fixation through-hole 55 are formed at the first assembling surface 51 of the first connector J36 for the second refrigerant. However, since the first connector J36 for the second refrigerant does not have the first overhanging portion 71, the outer peripheral edge portion of the first assembling surface 51 at the end portion of the first connector J36, which is located on the first fixation through-hole 55 side in the first direction DR1, is shaped into an arcuate form.

Figure 17:
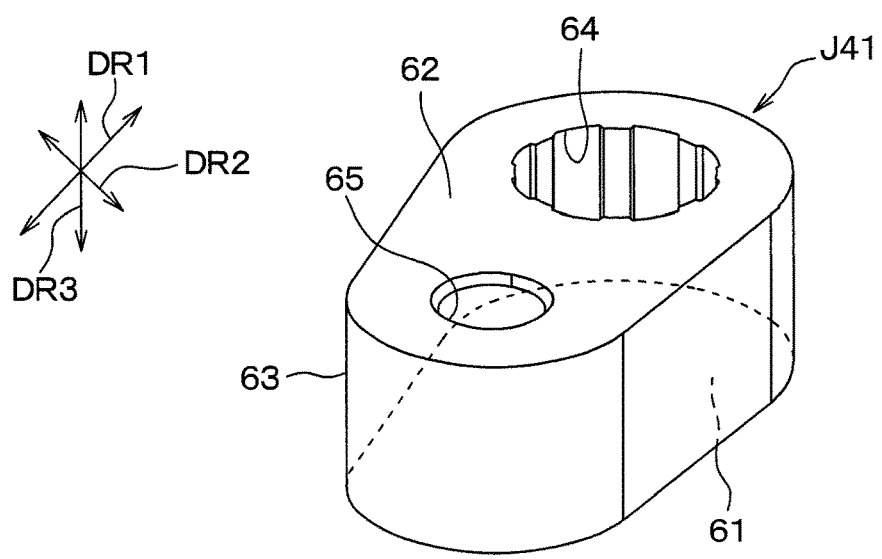
FIG. 17 is a perspective view of a second connector for the second refrigerant according to the first embodiment.
Figure 18:
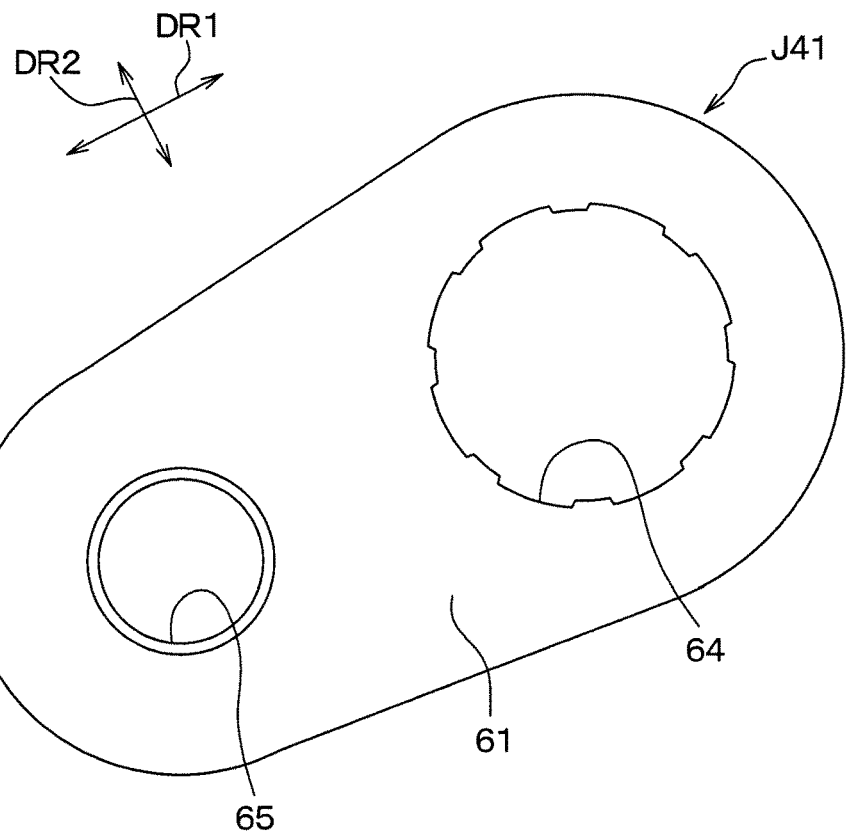
FIG. 18 is a plan view of the second connector for the second refrigerant according to the first embodiment.

Similar to the second connector 41 for the first refrigerant, as shown in FIGS. 17 and 18, the second connector J41 for the second refrigerant, the second flow passage through-hole 64 and the second fixation through-hole 65 are formed at the second assembling surface 61 of the second connector J41. However, since the second connector J41 for the second refrigerant does not have the second overhanging portion 81, the outer peripheral edge portion of the second assembling surface 61 at the end portion of the second connector J41, which is located on the second fixation through-hole 65 side in the first direction DR1, is shaped into an arcuate form.

Figure 19:
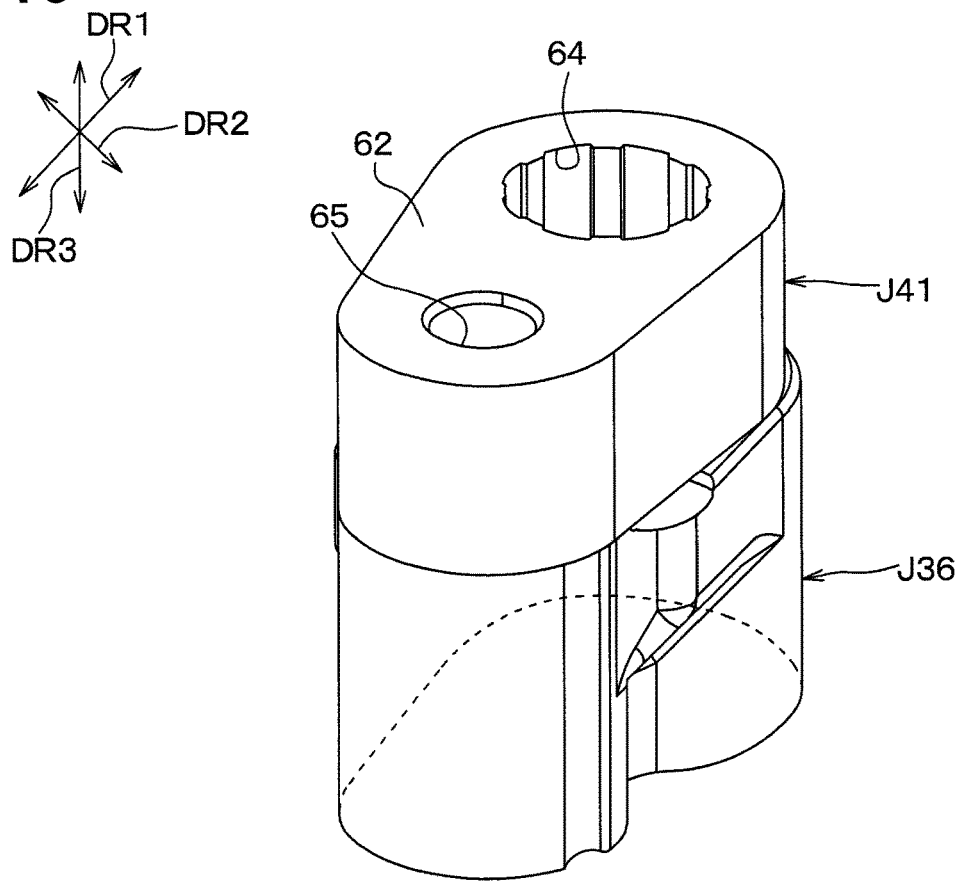
FIG. 19 is a perspective view showing an assembled state of the first and second connectors for the second refrigerant according to the first embodiment.
Figure 20:
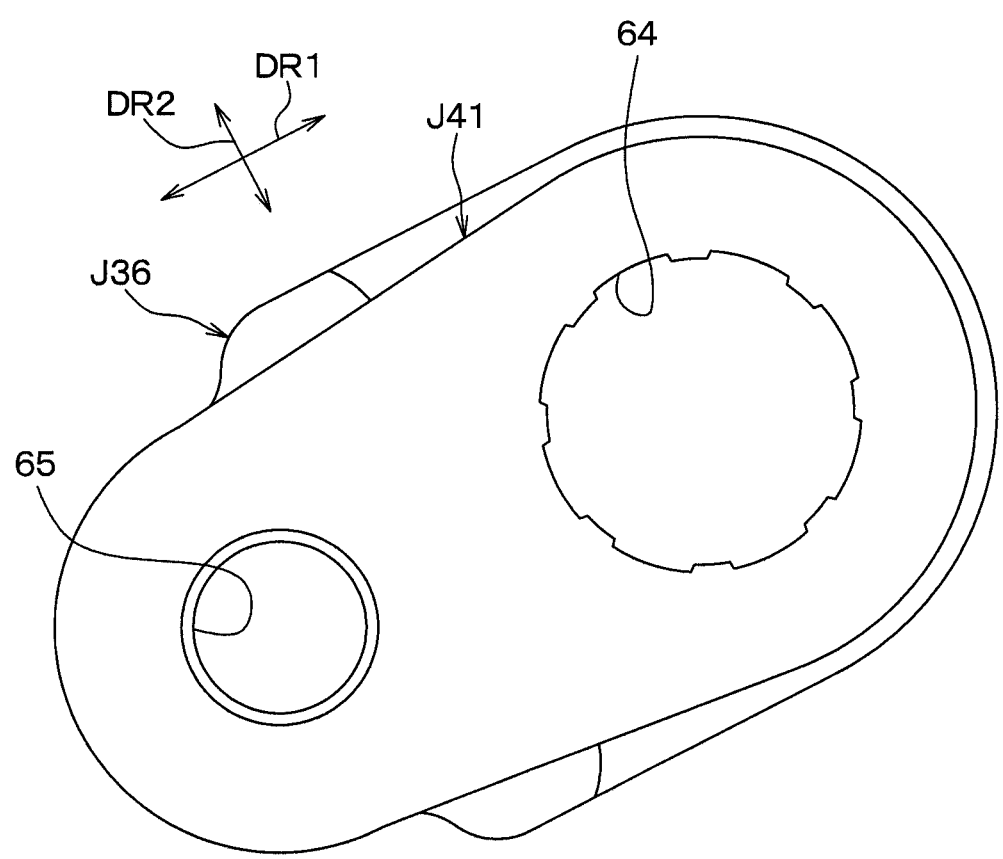
FIG. 20 is a plan view showing the assembled state of the first and second connectors for the second refrigerant according to the first embodiment.

As shown in FIGS. 19 and 20, the first and second connectors J36, J41 for the second refrigerant are assembled together in a state where the first and second assembling surfaces 51, 61 contact with each other. The first and second connectors J36, J41 for the second refrigerant do not have the projecting portion, so that the assembling of the first and second connectors J36, J41 is possible.

Figure 21:
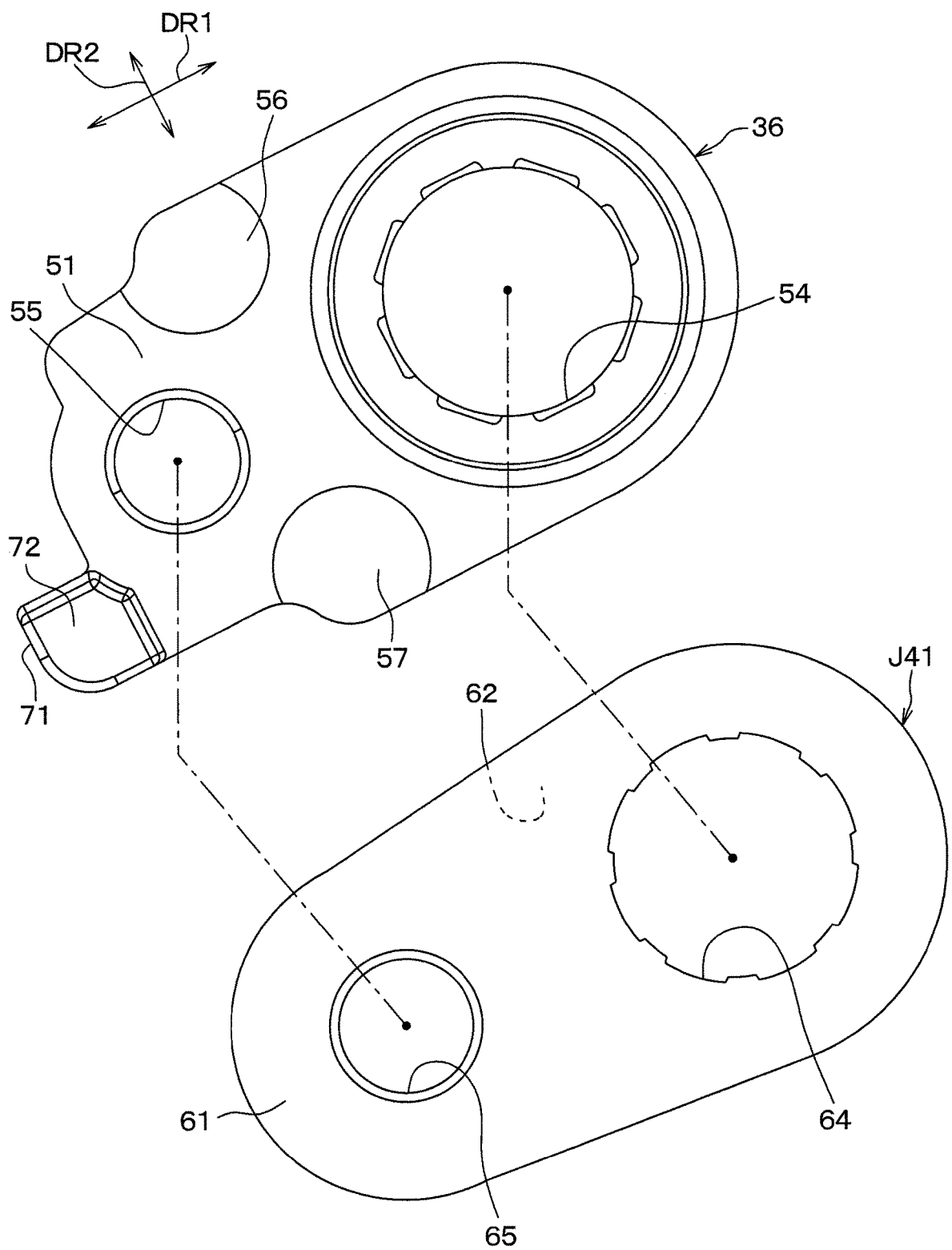
FIG. 21 is a plan view showing an assembling surface of the first connector for the first refrigerant and an assembling surface of the second connector for the second refrigerant according to the first embodiment.
Figure 22:
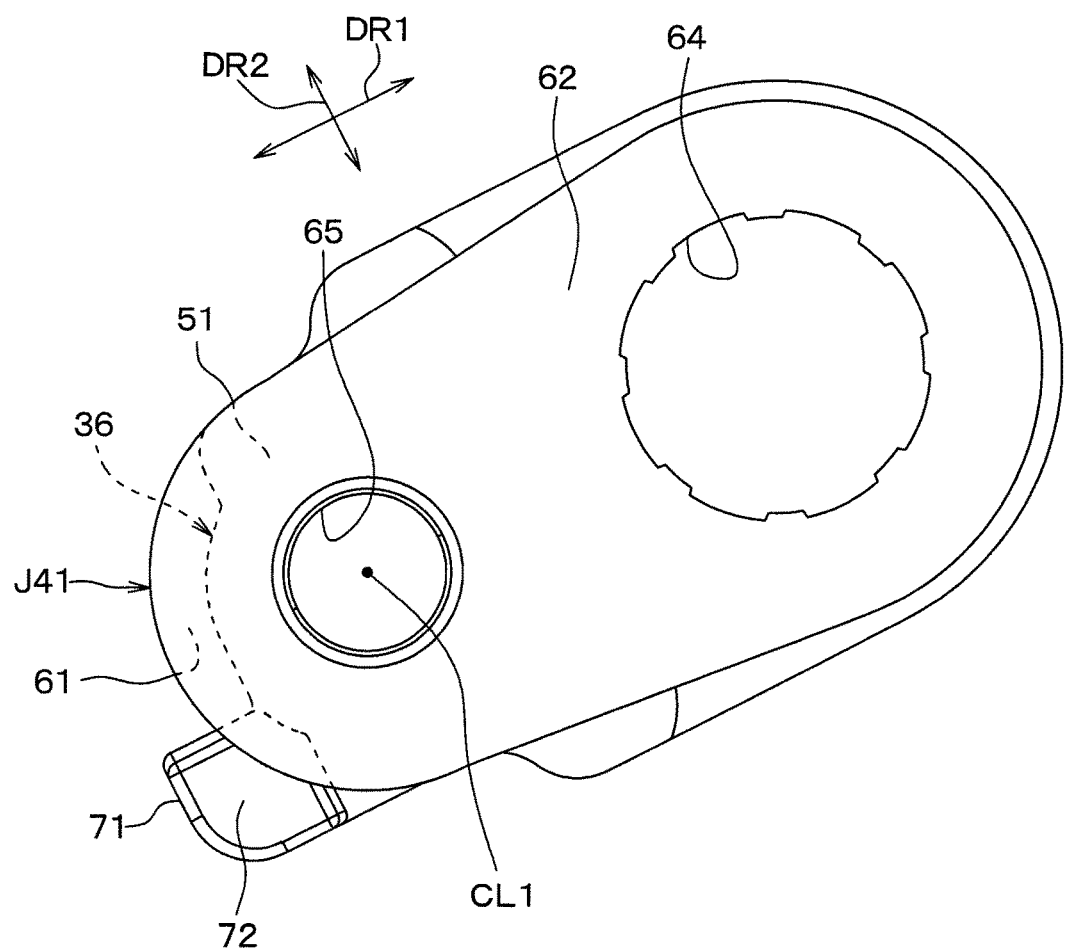
FIG. 22 is a plan view showing an opposed state where the assembling surface of the first connector for the first refrigerant and the assembling surface of the second connector for the second refrigerant are opposed to each other according to the first embodiment.

Here, as shown in FIGS. 21 and 22, the first projecting portion 72 of the first connector 36 for the first refrigerant is placed at a location where the first projecting portion 72 contacts the second assembling surface 61 of the second connector J41 for the second refrigerant at the time of trying to assemble the first connector 36 for the first refrigerant and the second connector J41 for the second refrigerant together. As understood through comparison between FIG. 11 and FIG. 22, in the second connector 41 for the first refrigerant, the part 61a, which corresponds to the first projecting portion 72, in the outer peripheral edge portion of the second assembling surface 61 is placed at a location that is closer to the center CL1 of the second fixation through-hole 65 in comparison to the outer peripheral edge portion of the second assembling surface 61 for the second refrigerant.

Figure 23:
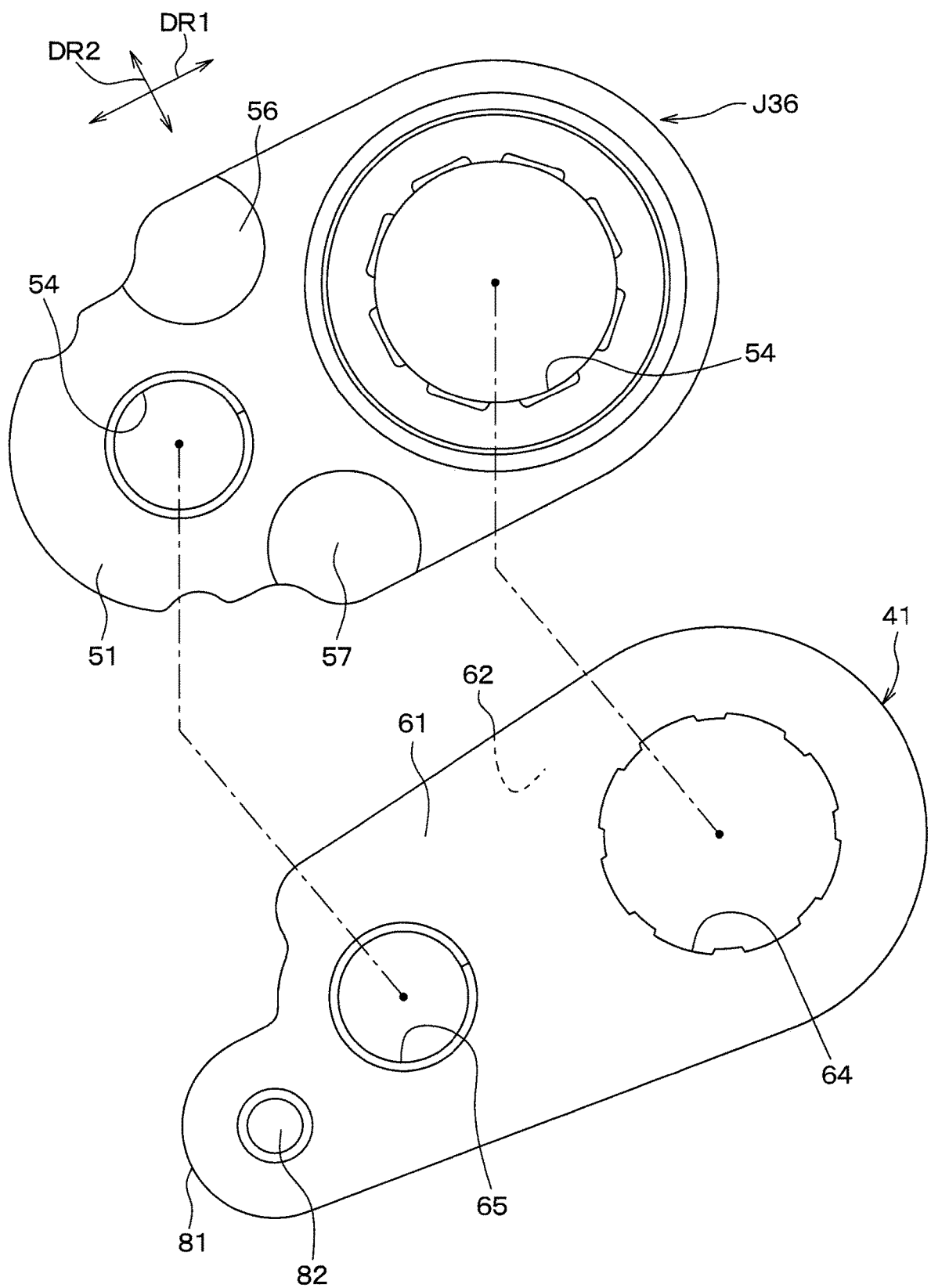
FIG. 23 is a plan view showing an assembling surface of the second connector for the first refrigerant and an assembling surface of the first connector for the second refrigerant according to the first embodiment.
Figure 24:
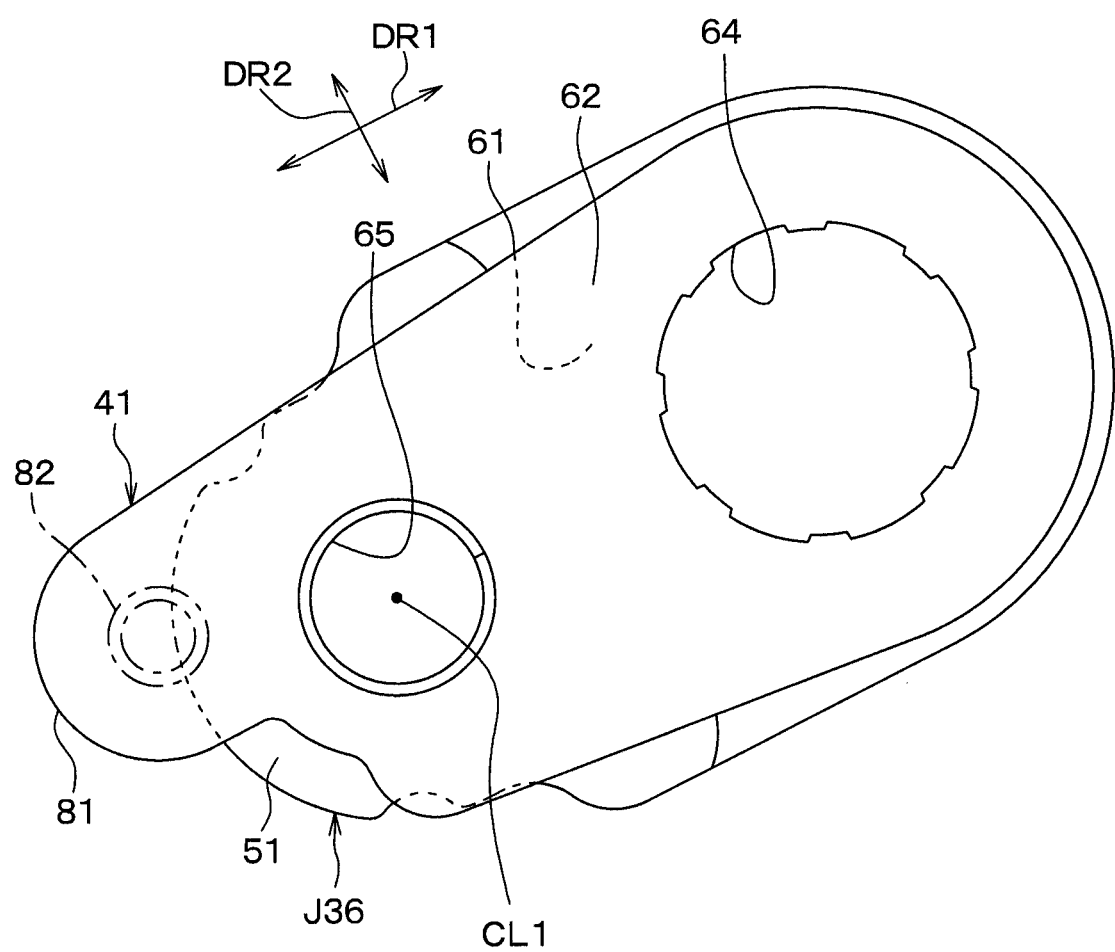
FIG. 24 is a plan view showing an opposed state where the assembling surface of the second connector for the first refrigerant and the assembling surface of the first connector for the second refrigerant are opposed to each other according to the first embodiment.

Furthermore, as shown in FIGS. 23 and 24, the second projecting portion 82 of the second connector 41 for the first refrigerant is placed at a location where the second projecting portion 82 contacts the first assembling surface 51 of the first connector J36 for the second refrigerant at the time of trying to assemble the second connector 41 for the first refrigerant and the first connector J36 for the second refrigerant. As understood through comparison between FIG. 11 and FIG. 24, in the first connector 36 for the first refrigerant, the part 51a, which corresponds to the second projecting portion 82, in the outer peripheral edge portion of the first assembling surface 51 is placed at a location that is closer to the center CL1 of the first fixation through-hole 55 in comparison to the outer peripheral edge portion of the first assembling surface 51 for the second refrigerant.

Next, main features of the pair of connectors 36, 41 for the first refrigerant according to the present embodiment will be described.

(1) At the assembling step of the refrigeration cycle apparatus 10 on the vehicle body, the constituent components 11, 12, 13, 14 of the refrigeration cycle apparatus 10 are installed to the vehicle body, and the constituent components 11, 12, 13, 14 are interconnected through the refrigerant pipes 15. At this time, a worker selects the connectors that correspond to the type of refrigerant to be used. According to the present embodiment, since the refrigeration cycle apparatus 10, which uses the first refrigerant, is assembled, the worker assembles the refrigerant pipes 15, to which the second connectors 41, 42 for the first refrigerant are assembled, to the inlet pipe 34 and the outlet pipe 35 of the condenser 12, to which the first connectors 36, 37 for the first refrigerant are assembled.

At this time, the first projecting portion 72 is provided to the first overhanging portion 71 of the first connector 36 for the first refrigerant, and the second projecting portion 82 is provided to the second overhanging portion 81 of the second connector 41 for the first refrigerant. In other words, the location of the first projecting portion 72 is set at the location that does not contact the second assembling surface 61 for the first refrigerant, and the location of the second projecting portion 82 is set at the location that does not contact the first assembling surface 51 for the first refrigerant.

Therefore, at the time of assembling the first and second connectors 36, 41 for the first refrigerant, the first projecting portion 72 does not interfere with the second assembling surface 61, and the second projecting portion 82 does not interfere with the first assembling surface 51. Thereby, the first and second connectors 36, 41 for the first refrigerant are assembled together.

Furthermore, the location of the first projecting portion 72 is set at the location that contacts the second assembling surface 61 of the second connector J41 for the second refrigerant. Therefore, the first connector 36 for the first refrigerant and the second connector J41 for the second refrigerant cannot be assembled together since the first projecting portion 72 interferes with the second assembling surface 61. Similarly, the location of the second projecting portion 82 is set at the location where the second projecting portion 82 contacts the first assembling surface 51 of the first connector J36 for the second refrigerant. Therefore, the second connector 41 for the first refrigerant and the first connector J36 for the second refrigerant cannot be assembled together since the second projecting portion 82 interferes with the first assembling surface 51.

As discussed above, according to the present embodiment, the assembling of the first and second connectors 36, 41 for the first refrigerant with each other is enabled, and the assembling of one of the first and second connectors 36, 41 for the first refrigerant to one of the first and second connectors J36, J41 for the second refrigerant is disabled. In this way, it is possible to prevent the erroneous assembling of the one of the first and second connectors 36, 41 for the first refrigerant to the one of the first and second connectors J36, J41 for the second refrigerant. The above discussion is also applicable to the first and second connectors 37, 41 for the first refrigerant.

Therefore, it is possible to prevent erroneous installation of the refrigerant pipes 15 for the second refrigerant to the inlet pipe 34 and the outlet pipe 35 of the condenser 12, which have the first connectors 36, 37 for the first refrigerant.

Furthermore, contrary to the above case, in the case where the condenser 12, which includes the first connector J36 for the second refrigerant, is erroneously installed to the vehicle body, the refrigerant pipe 15, to which the second connector 41 for the first refrigerant is installed, cannot be installed to this condenser 12. Therefore, at the time of assembling the refrigeration cycle apparatus 10, the erroneous installation of the condenser 12, which has the first connector J36 for the second refrigerant, can be prevented.

Furthermore, in the present embodiment, as discussed above, the shapes of the first and second connectors 36, 41 for the first refrigerant, can be changed relative to the shapes of the first and second connectors J36, J41 for the second refrigerant through the design change. Thus, according to the present embodiment, the design change for the shapes of the first and second connectors J36, J41 for the second refrigerant can be dispensed.

(2) It is conceivable to change the configurations of the pair of connectors for the first refrigerant relative to the pair of connectors J36, J41 for the second refrigerant through the design change like the connectors recited in the patent literature 1. Specifically, although not depicted in a drawing, the first projecting portion may be provided at the first assembling surface 51, and the second projecting portion may be provided at the second assembling surface 61. Furthermore, the receiving hole for receiving the second projecting portion may be formed at the first assembling surface 51, and the receiving hole for receiving the first projecting portion may be formed at the second assembling surface 61. The configuration of the rest of the pair of connectors for the first refrigerant may be kept to be the same as that of the pair of connectors J36, J41 for the second refrigerant.

In such a case, in the assembled state of the pair of connectors for the first refrigerant, the first and second projections cannot be visually recognized. The outer shapes of the pair of connectors for the first refrigerant are the same as the outer shapes of the pair of connectors J36, J41 for the second refrigerant. Therefore, the pair of connectors for the first refrigerant cannot be visually distinguished from the pair of connectors for the second refrigerant, and vice versa.

Therefore, in the case where the worker erroneously selects the condenser 12, which includes the connector for the second refrigerant, and the refrigerant pipe, which includes the connector for the second refrigerant, the worker cannot notice the error after the assembling of the pair of connectors together by looking at the pair of connectors.

In contrast, in the present embodiment, as shown in FIG. 10, in the assembled state of the first and second connectors 36, 41 for the first refrigerant, the first overhanging portion 71 and the first projecting portion 72 are placed on the outside of the peripheral surface 63 of the second connector 41. Furthermore, the second overhanging portion 81 and the second projecting portion 82 are placed on the outside of the peripheral surface 53 of the first connector 36. Therefore, even after the assembling of the first and second connectors 36, 41 together, the first and second overhanging portions 71, 81 and the first and second projecting portions 72, 82 can be viewed. Thus, the worker can determine whether the use of the first and second connectors 36, 41 is proper by visually checking whether the first and second overhanging portions 71, 81 and the first and second projecting portions 72, 82 are present after the assembling of the first and second connectors 36, 41 together.

As a result, the erroneous use of the pair of connectors can be limited according to the present embodiment. That is, at the time of assembling the refrigeration cycle apparatus 10 for the first refrigerant, it is possible to limit the erroneous assembling of both of the condenser 12, which includes the connectors for the second refrigerant, and the refrigerant pipes 15, which include the connectors for the second refrigerant.

(3) In the case where the receiving hole, which receives the second projecting portion, is formed in the first assembling surface 51, and the receiving hole, which receives the first projecting portion, is formed in the second assembling surface 61 like in the case of the connectors recited in the patent literature 1, it is required to have a relatively large peripheral region around each of the receiving holes. Thus, in such a case, the sizes of the first and second connectors are disadvantageously increased.

In contrast, according to the present embodiment, the projecting portion 72, 82 is formed at the overhanging portion 71, 81 of the connector 36, 41. Therefore, it is not required to form the receiving hole at the mating connector, which mates with the0 connector 36, 41, unlike the connectors of the patent literature 1. In this way, it is possible to avoid the increasing of the size of the connector, which would be caused by the forming of the receiving hole.

Figure 25:
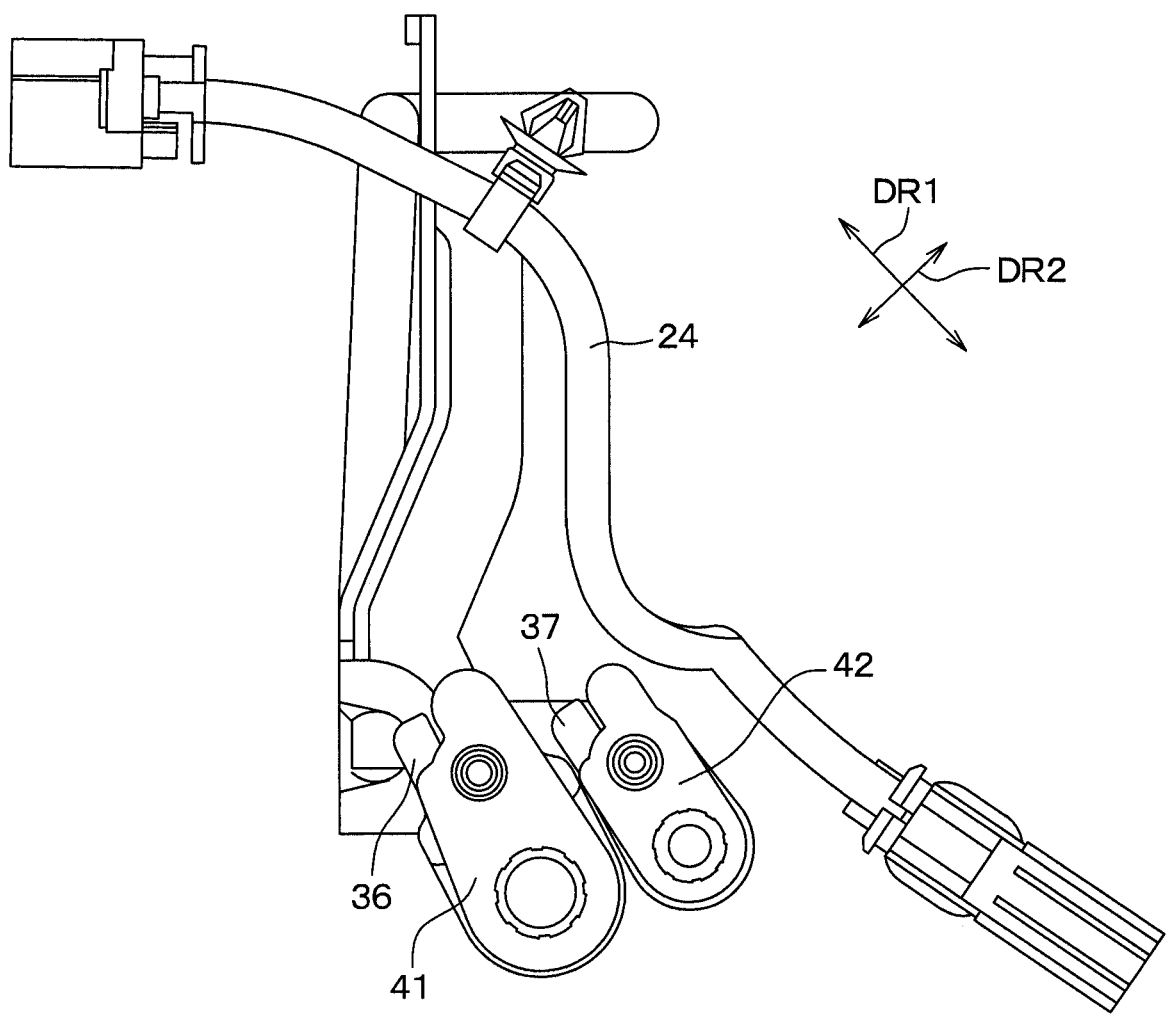
FIG. 25 is a plan view showing an installed state where the first and second connectors for the first refrigerant according to the first embodiment are placed in an inside of an engine room.

(4) The condenser 12 is placed at the vehicle front side of the engine room 21. Therefore, in the state where the condenser 12 is installed to the engine room 21, as shown in FIG. 25, a wire harness 24 of a head lamp may possibly be placed adjacent to the first and second connectors 36, 37, 41, 42 in some cases. FIG. 25 is an enlarged view of a region XXV in FIG. 1.

Therefore, in the present embodiment, the first overhanging portion 71 is placed at the end portion of the first connector 36, 37, which is located at the first fixation through-hole 55 side in the first direction DR1. The second overhanging portion 81 is formed at the end portion of the second connector 41, 42, which is located at the second fixation through-hole 65 side in the first direction DR1. In this way, as shown in FIG. 25, even in the case where the wire harness 24 is placed adjacent to the first and second connectors 36, 37, 41, 42 in the second direction DR2, it is possible to form the first and second overhanging portions 71, 81 and the first and second projecting portions 72, 82.

As discussed above, the first and second connectors 36, 37, 41, 42 of the present embodiment can be used at the engine room environment where the layout condition is strictly limited.

(Second Embodiment)

As shown in FIGS. 26 to 31, the present embodiment is a modification of the first embodiment, in which the locations of the first and second overhanging portions 71, 81 of the first and second connectors 36, 41 for the first refrigerant are modified from those of the first embodiment. The remaining structure of the refrigeration cycle apparatus 10 is the same as that of the first embodiment.

Figure 26:
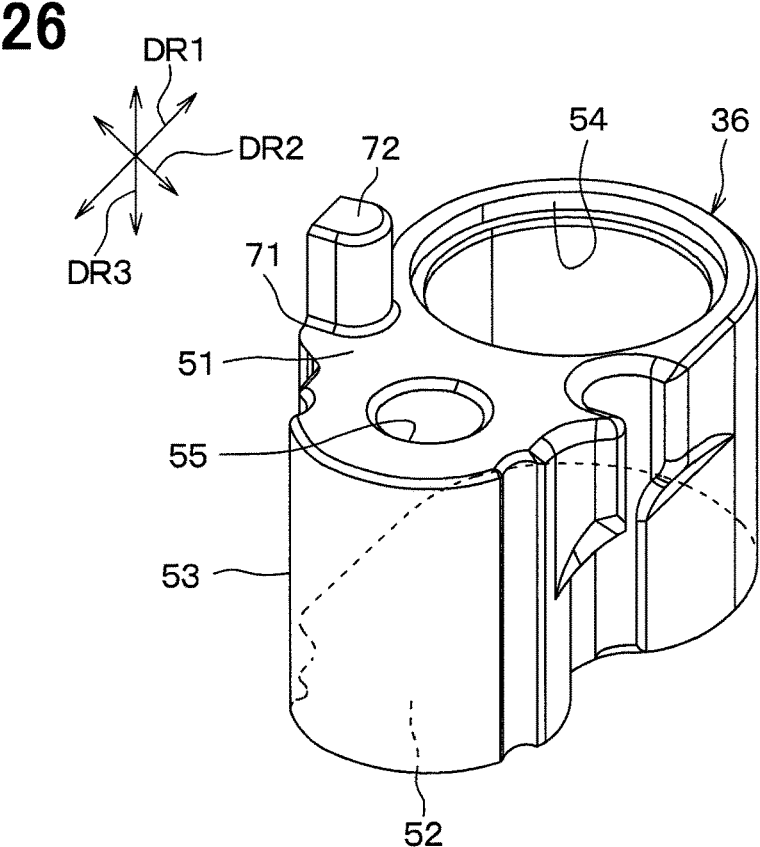
FIG. 26 is a perspective view of a first connector for the first refrigerant according to a second embodiment.
Figure 27:
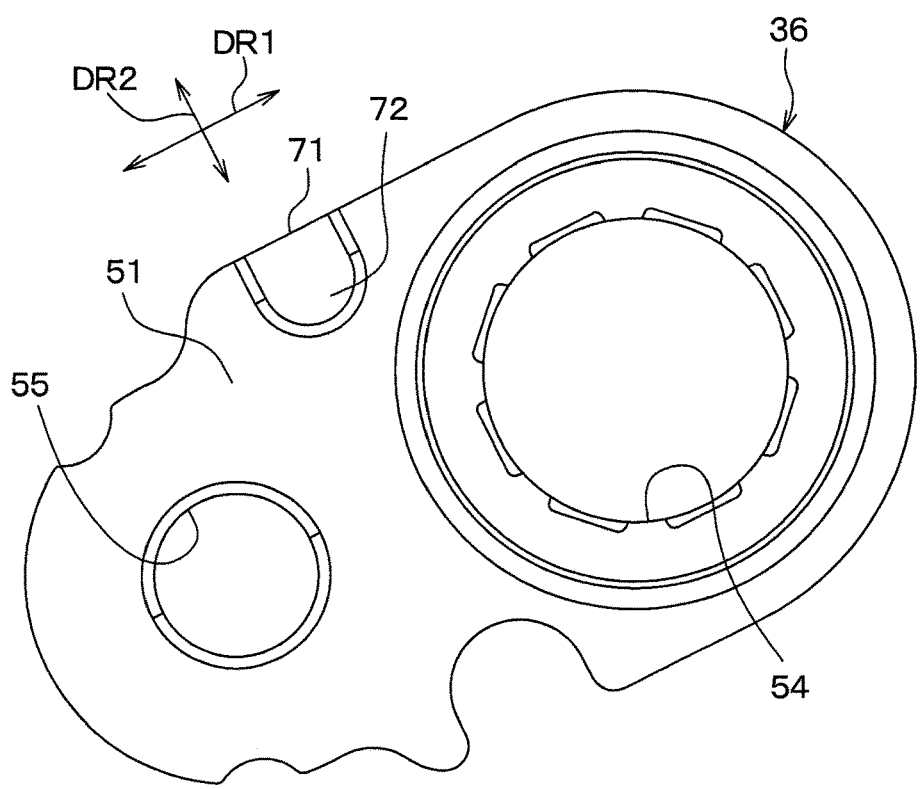
FIG. 27 is a plan view of the first connector for the first refrigerant according to the second embodiment.
Figure 28:
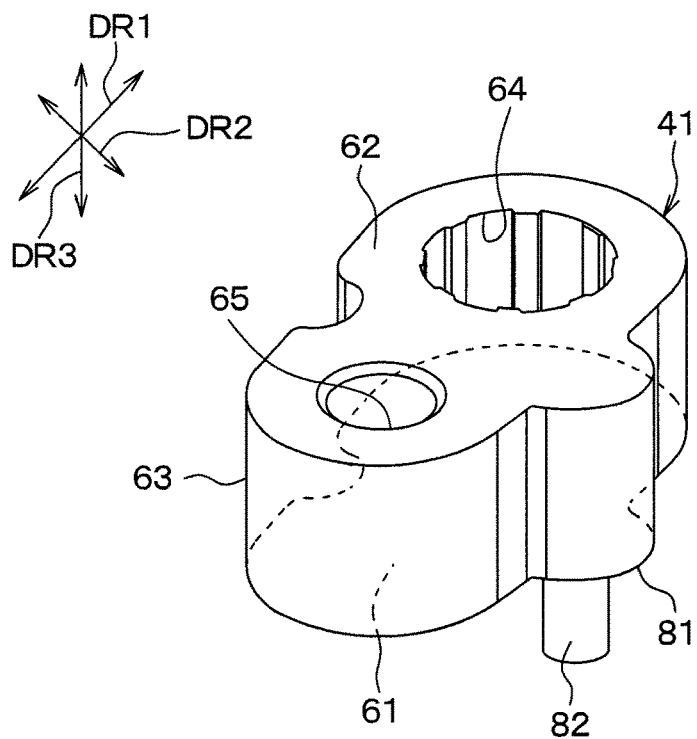
FIG. 28 is a perspective view of a second connector for the first refrigerant according to the second embodiment.
Figure 29:
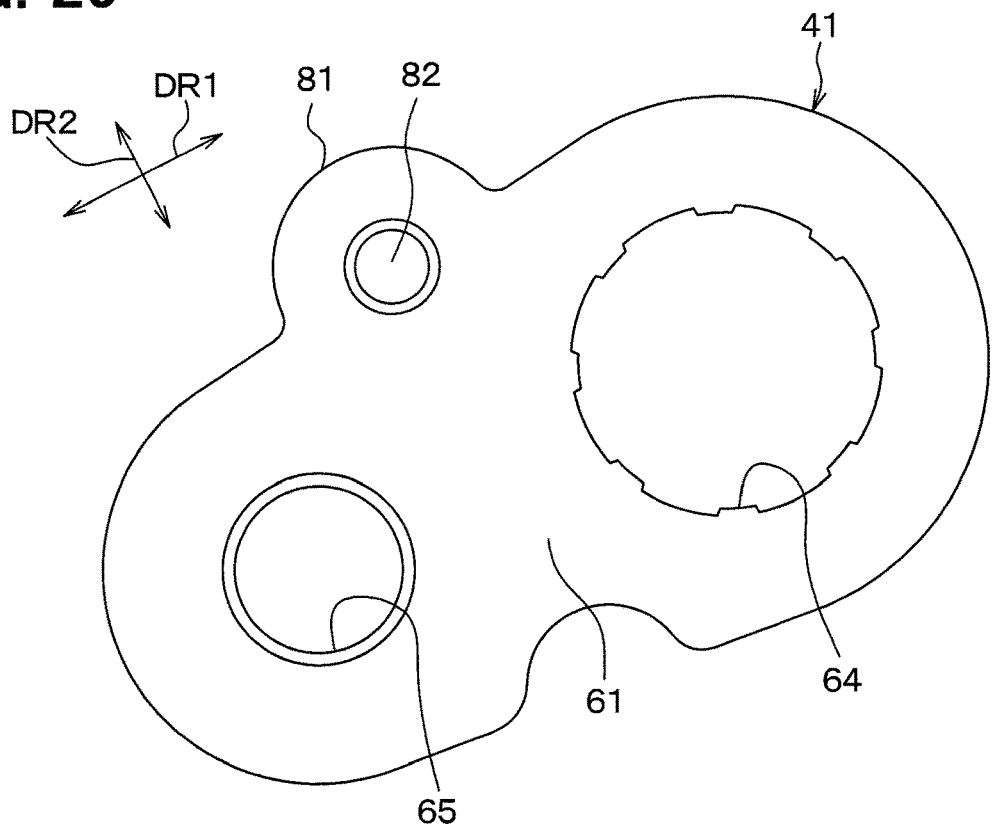
FIG. 29 is a plan view of the second connector for the first refrigerant according to the second embodiment.
Figure 30:
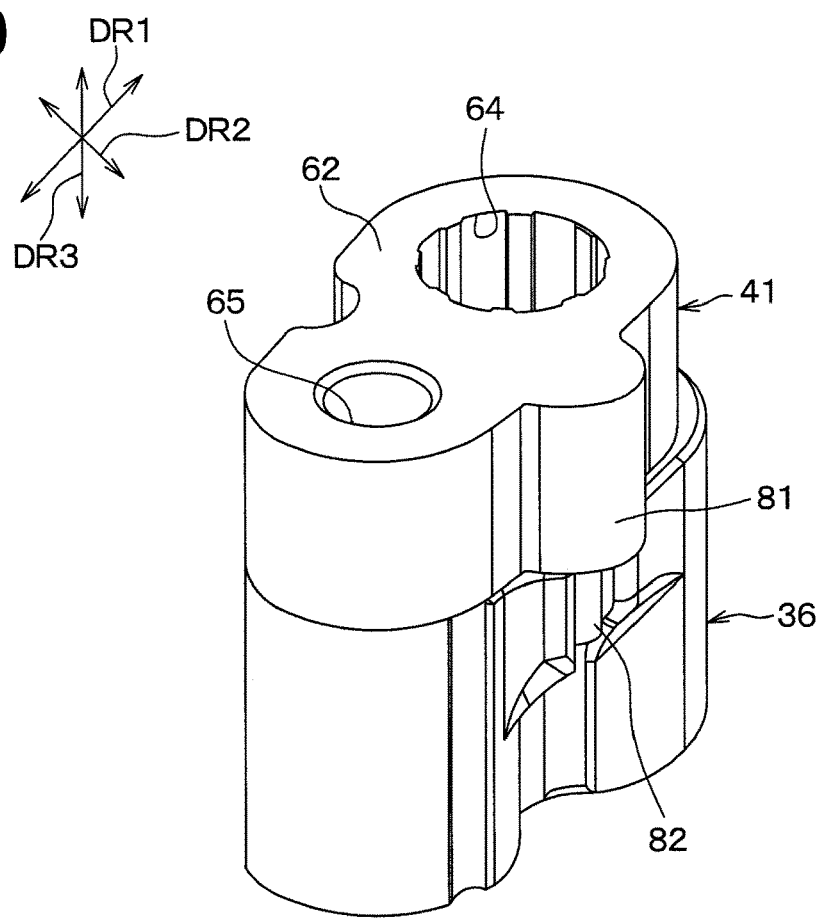
FIG. 30 is a plan view showing an assembled state of the first and second connectors for the first refrigerant according to the second embodiment.
Figure 31:
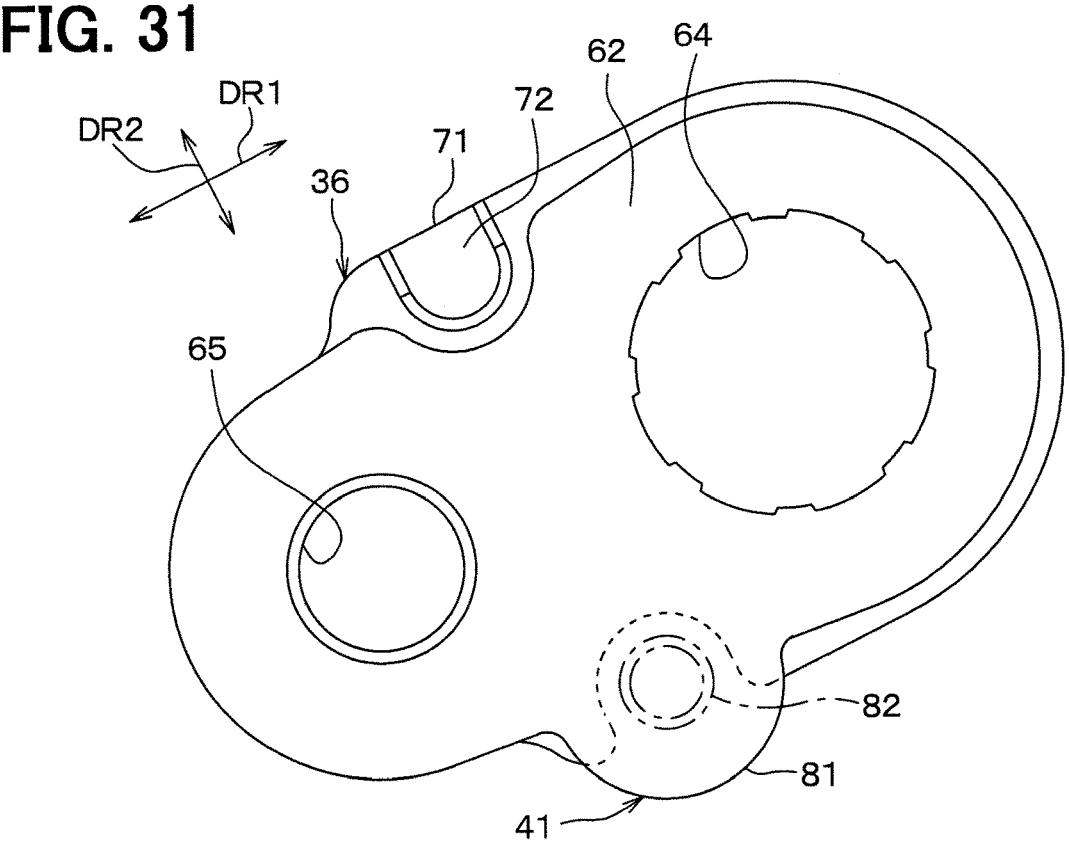
FIG. 31 is a plan view showing the assembled state of the first and second connectors for the first refrigerant according to the second embodiment.

As shown in FIGS. 26 and 27, the first overhanging portion 71 is formed at an end portion of the first connector 36 located at one side in the second direction DR2 such that the first overhanging portion 71 is placed between the first flow passage through-hole 54 and the first fixation through-hole 55.

As shown in FIGS. 28, 29, 30 and 31, the second overhanging portion 81 is formed at an end portion of the second connector 41 located at an opposite side that is opposite from the first overhanging portion 71 in the second direction DR2 in the assembled state of the first and second connectors 36, 41 such that the second overhanging portion 81 is placed between the second flow passage through-hole 64 and the second fixation through-hole 65 in the second connector 41.

Figure 32:
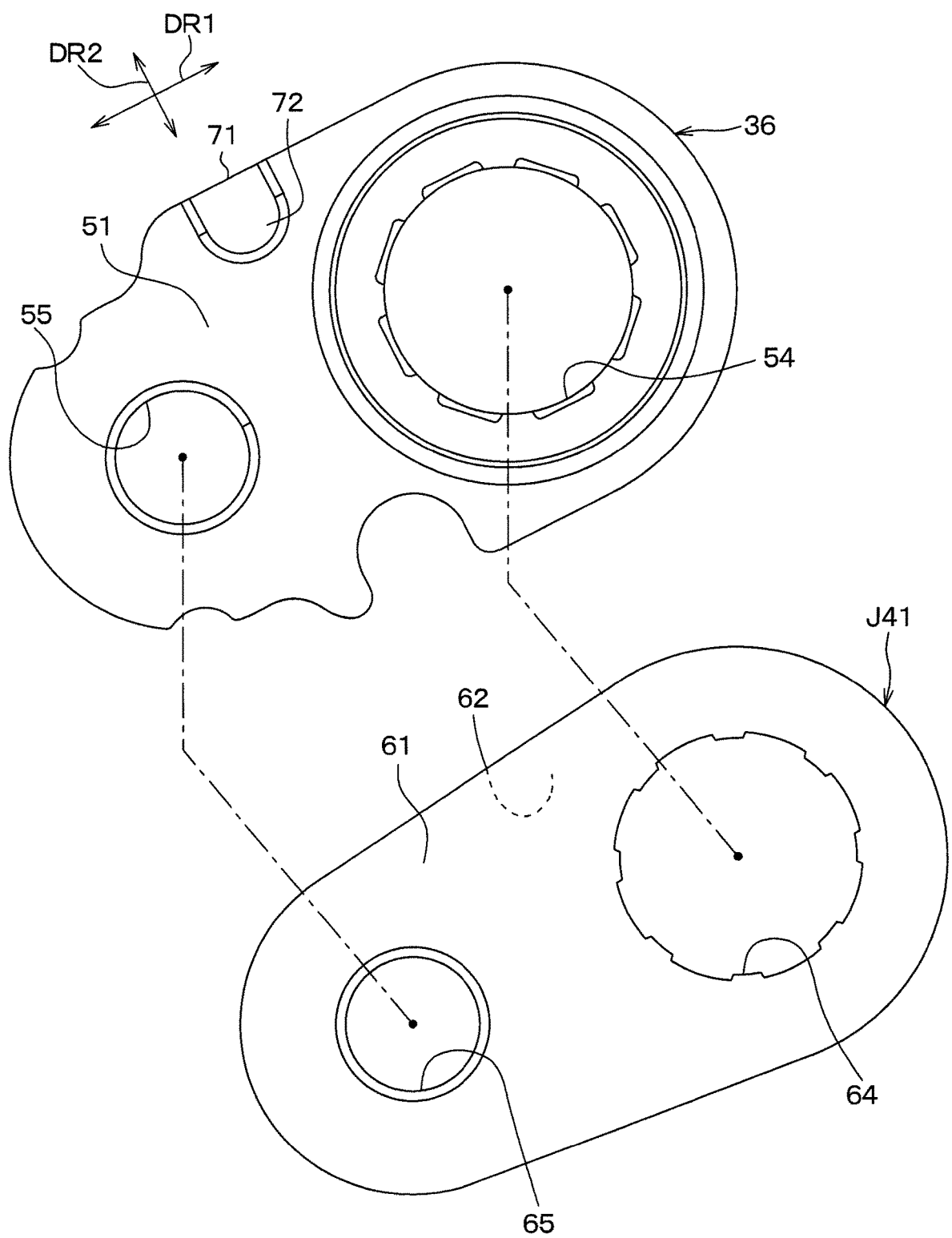
FIG. 32 is a plan view showing an assembling surface of the first connector for the first refrigerant and an assembling surface of the second connector for the second refrigerant according to the second embodiment.
Figure 33:
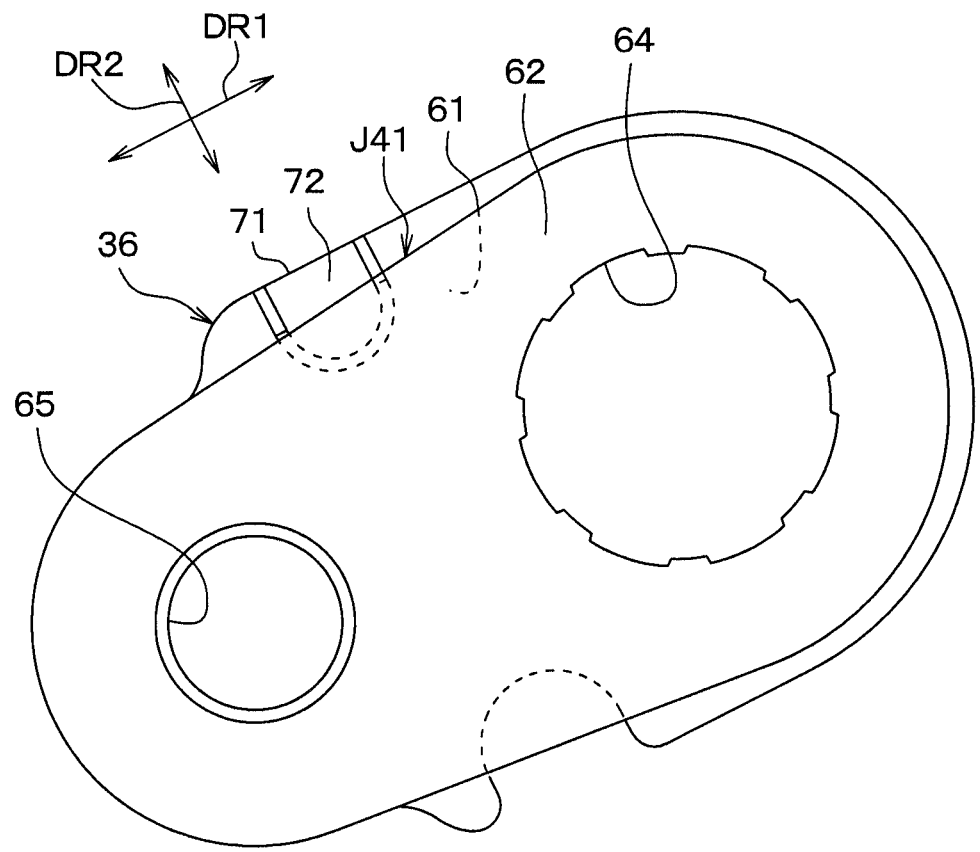
FIG. 33 is a plan view showing an opposed state where the assembling surface of the first connector for the first refrigerant and the assembling surface of the second connector for the second refrigerant are opposed to each other according to the second embodiment.

Even in the present embodiment, similar to the first embodiment, as shown in FIGS. 32 and 33, the first projecting portion 72 is formed at the location where the first projecting portion 72 contacts the second assembling surface 61 for the second refrigerant at the time of assembling the first connector 36 for the first refrigerant and the second connector J41 for the second refrigerant together.

Figure 34:
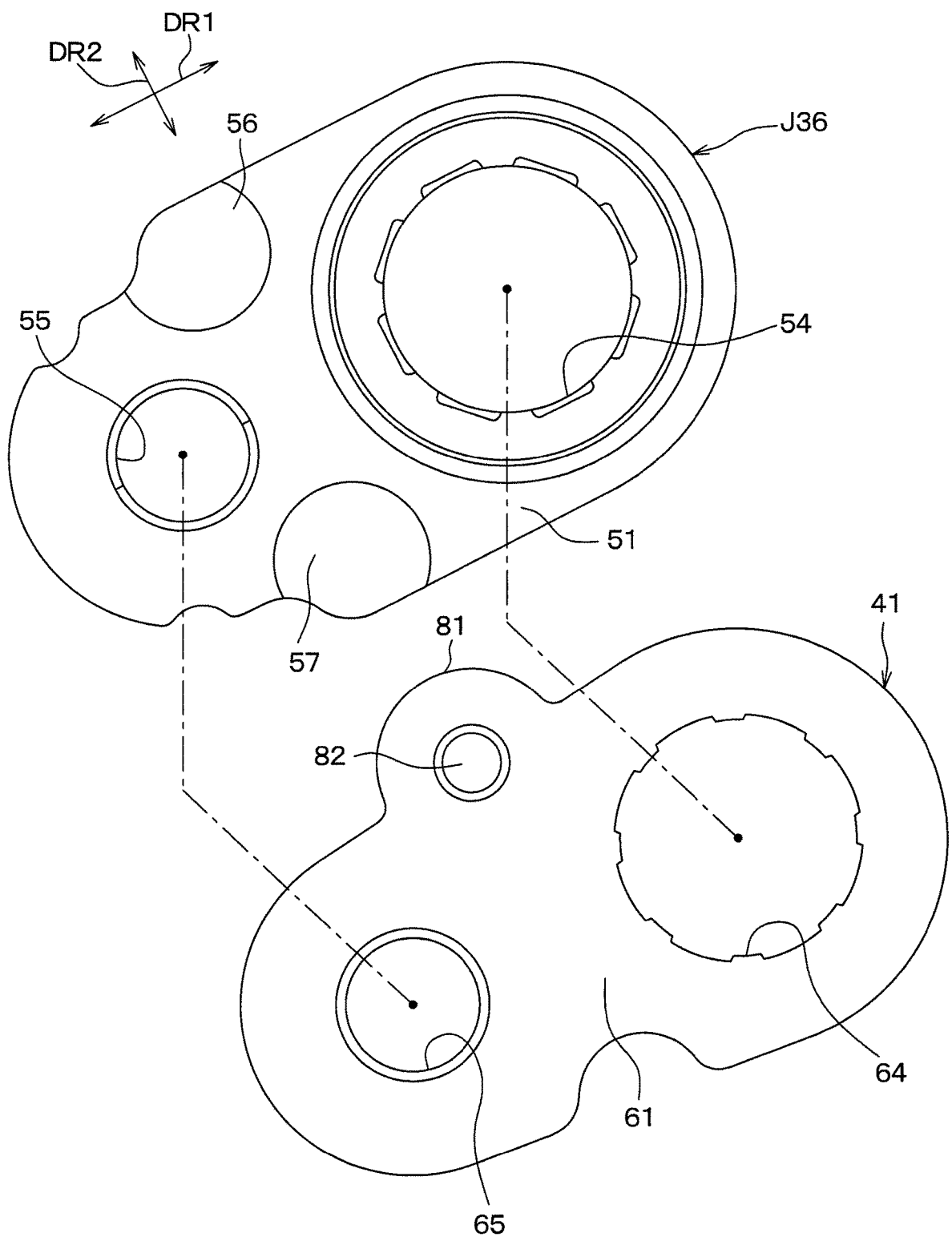
FIG. 34 is a plan view showing an assembling surface of the second connector for the first refrigerant and an assembling surface of the first connector for the second refrigerant according to the second embodiment.
Figure 35:
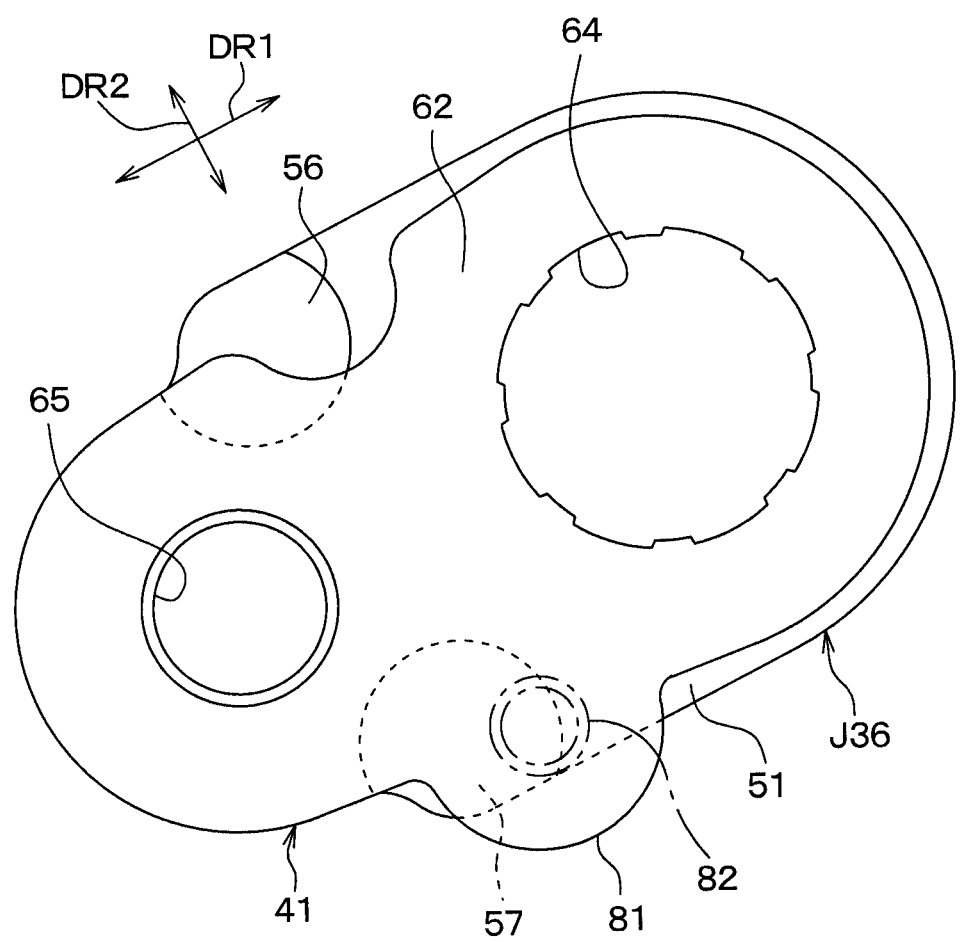
FIG. 35 is a plan view showing an opposed state where the assembling surface of the second connector for the first refrigerant and the assembling surface of the first connector for the second refrigerant are opposed to each other according to the second embodiment.

Similarly, as shown in FIGS. 34 and 35, the second projecting portion 82 is formed at the location where the second projecting portion 82 contacts the first assembling surface 51 for the second refrigerant at the time of assembling the second connector 41 for the first refrigerant and the first connector J36 for the second refrigerant together.

Even in the present embodiment, the advantages (1) to (3) of the first embodiment can be achieved.

Furthermore, according to the present embodiment, even in the case where a component, which is installed in the engine room 21, is present at a location, which is adjacent to the first and second connectors 36, 41 in the first direction DR1, the first and second overhanging portions 71, 81 and the first and second projecting portions 72, 82 can be provided. As discussed above, the first and second connectors 36, 41 of the present embodiment can be used at the engine room environment where the layout condition is strictly limited.

(Other Embodiments)

The present disclosure should not be limited to the above embodiments, and the above embodiments may be modified in an appropriate manner within the scope of the present disclosure recited in the claims, for example, as discussed below.

(1) In each of the above embodiments, the first connectors 36, 37 for the first refrigerant are respectively provided at the inlet pipe 34 and the outlet pipe 35 of the condenser 12. However, the present disclosure should not be limited to this configuration. The first connectors 36, 37 for the first refrigerant may be directly formed at the header tanks 32, 33 without interposing the inlet pipe 34 and the outlet pipe 35 therebetween. In such a case, the header tank, at which the first connector is formed, serves as a first flow passage forming member, which forms a flow passage of a fluid.

(2) In each of the above embodiments, the refrigerant pipe 15*b* and the refrigerant pipe 15*c* are integrated together. Alternatively, the refrigerant pipe 15*b* and the refrigerant pipe 15*c* may not be integrated together. In such a case, the first and second connectors for the first refrigerant may be respectively formed at a refrigerant pipe, which needs to be changed according to a type of refrigerant, and a flow passage forming component, which is connected to this refrigerant pipe.

(3) In each of the above embodiments, the pair of connectors of the present disclosure is used as the pair of connectors 36, 41 that connect between the condenser 12 and the refrigerant pipe 15. However, the present disclosure should not be limited to this configuration. The pair of connectors of the present disclosure may be used as a pair of connectors that connect between the compressor 11 and the refrigerant pipe 15. Furthermore, the pair of connectors of the present disclosure may be used as a pair of connectors that connect between the expansion valve 13 and the refrigerant pipe.

(4) In each of the above embodiments, the pair of connectors of the present disclosure is used as the pair of connectors for the first refrigerant. Alternatively, the pair of connectors of the present disclosure may be used as the pair of connectors for the second refrigerant instead of the pair of connectors for the first refrigerant.

(5) In each of the above embodiments, the pair of connectors of the present disclosure is used as the pair of connectors for the refrigerant pipes used in the refrigeration cycle apparatus 10 of the vehicle. However, the present disclosure should not be limited to this application. The pair of connectors of the present disclosure may be used as a pair of connectors that connect between a first flow passage forming member, which forms a flow passage of a fluid, and a second flow passage forming member that is formed separately from the first flow passage forming member and forms a flow passage of the fluid.

(6) The above respective embodiments are not unrelated with each other and may be combined with one another or more in an appropriate manner unless such a combination is obviously impossible. Furthermore, in each of the above embodiments, all of the constituent elements of the embodiment are not necessarily indispensable unless it is explicitly recited the constituent component(s) is indispensable and unless it is considered to be indispensable in view of the principle of the present disclosure.

What is claimed is:

1. A pair of connectors comprising:
    a first connector that is configured to be coupled to a first flow passage forming member, which is configured to conduct a fluid; and
    a second connector that is configured to be coupled to a second flow passage forming member, which is configured to conduct the fluid, while the second connector is assembled to the first connector, wherein:
    the first connector includes a first assembling surface that contacts the second connector in an assembled state where the first connector and the second connector are assembled together;
    a first flow passage through-hole and a first fixation through-hole are formed in the first assembling surface;
    the second connector includes a second assembling surface that contacts the first assembling surface in the assembled state where the first connector and the second connector are assembled together;
    a second flow passage through-hole is formed at a corresponding location of the second assembling surface, which is opposed to the first flow passage through-hole in the assembled state where the first connector and the second connector are assembled together, and a second fixation through-hole is formed at a corresponding location of the second assembling surface, which is opposed to the first fixation through-hole in the assembled state where the first connector and the second connector are assembled together;
    in the assembled state where the first connector and the second connector are assembled together, a fixing member is inserted into the first fixation through-hole and the second fixation through-hole, and the fluid flows from one of the first flow passage forming member and the second flow passage forming member to the other one of the first flow passage forming member and the second flow passage forming member through the first flow passage through-hole and the second flow passage through-hole;
    the first connector includes a first overhanging portion, which overhangs outward from the second assembling surface in the assembled state where the first connector and the second connector are assembled together, and a first projecting portion, which projects from the first overhanging portion beyond a location of the first assembling surface toward a second connector side where the second connector is placed in the assembled state where the first connector and the second connector are assembled together;
    the second connector includes a second overhanging portion, which overhangs outward from the first assembling surface in the assembled state where the first connector and the second connector are assembled together, and a second projecting portion, which projects from the second overhanging portion beyond a location of the second assembling surface toward a first connector side where the first connector is placed in the assembled state where the first connector and the second connector are assembled together; and
    the first overhanging portion and the second overhanging portion are both located on one side of the first fixation through-hole and the second fixation through-hole, which is opposite to the first flow passage through-hole and the second flow passage through-hole in a direction of a straight line that connects between an axis of the first fixation through-hole and the second fixation through-hole and an axis of the first flow passage through-hole and the second flow passage through-hole in the assembled state.

2. The pair of connectors according to claim 1, wherein:
    the pair of connectors is configured to be used in a refrigeration cycle apparatus for a vehicle; and
    the fluid is a refrigerant.

3. A refrigeration cycle apparatus comprising:
    the pair of connectors of claim 1;
    the first flow passage forming member; and
    the second flow passage forming member.

4. The refrigeration cycle apparatus according to claim 3, comprising:
    a heat radiator that includes the first flow passage forming member, through which a refrigerant is inputted into the heat radiator, wherein the heat radiator radiates heat from the refrigerant; and
    the second flow passage forming member has a charge valve for charging the refrigerant.

5. The pair of connectors according to claim 1, wherein the first overhanging portion and the second overhanging portion are arranged side by side in a direction that is perpendicular to the direction of the straight line.

6. The pair of connectors according to claim 1, wherein the first overhanging portion and the second overhanging portion are bisected by the straight line.

* * * * *